United States Patent
Ly et al.

(10) Patent No.: US 10,542,416 B2
(45) Date of Patent: *Jan. 21, 2020

(54) TECHNIQUES FOR MOBILITY MODE SELECTION IN UPLINK-BASED AND DOWNLINK-BASED MOBILITY

(71) Applicant: QUALCOMM Incorporated, San Diego, CA (US)

(72) Inventors: Hung Dinh Ly, San Diego, CA (US); Heechoon Lee, San Diego, CA (US); Haitong Sun, Cupertino, CA (US); Tingfang Ji, San Diego, CA (US); Wanshi Chen, San Diego, CA (US); Keiichi Kubota, Tokyo (JP)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,695

(22) Filed: May 23, 2019

(65) Prior Publication Data

US 2019/0281440 A1  Sep. 12, 2019

Related U.S. Application Data

(63) Continuation of application No. 16/001,527, filed on Jun. 6, 2018, now Pat. No. 10,349,265, which is a
(Continued)

(51) Int. Cl.
*H04W 8/08* (2009.01)
*H04W 64/00* (2009.01)
(Continued)

(52) U.S. Cl.
CPC ............... *H04W 8/08* (2013.01); *H04L 43/16* (2013.01); *H04W 36/0061* (2013.01);
(Continued)

(58) Field of Classification Search
CPC ..... H04W 12/08; H04W 4/008; H04W 36/32; H04W 48/02; H04W 48/04; H04W 4/003;
(Continued)

(56) References Cited

U.S. PATENT DOCUMENTS

| 10,028,129 B2* | 7/2018 | Ly ........................... H04L 43/16 |
| 2008/0165737 A1* | 7/2008 | Uppala ................. H04W 36/32 |
| | | 370/331 |

(Continued)

OTHER PUBLICATIONS

International Search Report and Written Opinion—PCT/US2017/048024—ISA/EPO—dated Oct. 24, 2017.
(Continued)

*Primary Examiner* — Nimesh Patel
(74) *Attorney, Agent, or Firm* — Arent Fox, LLP

(57) ABSTRACT

Various aspects described herein relate to techniques for mobility mode selection in uplink-based and downlink-based mobility in wireless communications systems. In an aspect, a method for wireless communications may include determining that a user equipment (UE) is operating in a first mobility mode, determining whether the UE satisfies at least one condition associated with mobility of the UE for mobility mode selection, and selecting a second mobility mode based on a determination that the UE satisfies the at least one condition, wherein each of the first mobility mode and the second mobility mode is an uplink mobility mode or a downlink mobility mode. The techniques described herein may apply to different communications technologies, including the 5th Generation (5G) New Radio (NR) communications technology.

30 Claims, 21 Drawing Sheets

Related U.S. Application Data continuation of application No. 15/462,574, filed on Mar. 17, 2017, now Pat. No. 10,028,129.

(60) Provisional application No. 62/402,833, filed on Sep. 30, 2016, provisional application No. 62/399,885, filed on Sep. 26, 2016.

(51) Int. Cl.

| | | |
|---|---|---|
| *H04L 12/26* | (2006.01) | |
| *H04W 36/00* | (2009.01) | |
| *H04W 68/02* | (2009.01) | |
| *H04W 36/32* | (2009.01) | |
| *H04W 76/27* | (2018.01) | |

(52) U.S. Cl.
CPC ..... *H04W 36/0088* (2013.01); *H04W 64/003* (2013.01); *H04W 64/006* (2013.01); *H04W 68/02* (2013.01); *H04W 36/32* (2013.01); *H04W 76/27* (2018.02)

(58) Field of Classification Search
CPC . H04W 4/206; H04W 76/021; H04W 84/005; H04W 84/18; H04W 4/023; H04W 4/00; H04W 4/02; H04W 88/06; H04W 64/006; H04W 36/0083; H04W 4/001; H04W 4/021; H04W 4/027; H04W 64/00; H04W 88/02; H04W 72/042; H04W 72/0406; H04W 36/30; H04W 72/00; H04W 72/082; H04W 24/02; H04W 74/004; H04W 28/06; H04W 48/10; H04W 52/146; H04W 72/085; H04W 76/023; H04W 72/0413; H04W 36/14; H04W 52/0209; H04W 8/065; H04W 8/22; H04W 92/10; H04W 76/27; H04W 52/0251; H04W 76/15; H04W 72/04; H04W 72/02; H04W 92/20; H04W 36/18; H04W 36/0055; H04W 72/0453; H04W 72/1278; H04W 76/11; H04W 84/042; H04W 36/0069; H04W 74/006; H04W 76/00; H04W 72/12; H04W 84/045; H04W 36/08; H04W 28/18; H04W 48/18; H04W 88/16; H04W 8/205; H04W 60/005; H04W 8/08; H04W 16/02; H04W 16/18; H04W 72/10; H04M 1/72563; H04M 1/72572; H04M 2250/12; H04M 1/7253; H04M 1/2535; H04M 2203/053; H04M 3/42144; H04L 5/0055; H04L 1/1812; H04L 1/0026; H04L 1/0009; H04L 1/0003; H04L 1/001; H04L 5/0073; H04L 1/0027; H04L 2025/03426; H04L 47/10; H04L 47/14; H04L 1/0019; H04L 1/0017; H04L 5/0053; H04L 5/0007; H04L 5/001; H04L 1/1845; H04L 1/1854; H04L 2025/03414; H04L 1/0031; H04L 5/0057; H04L 27/0012; H04L 27/2601; H04L 5/0098; H04L 61/2007; H04L 5/0035; H04L 5/0048; Y02D 70/1224; Y02D 70/1242; Y02D 70/24; Y02D 70/1222; Y02D 70/144; Y02D 70/1262; Y02D 70/1244; Y02D 70/1246; Y02D 70/1226; Y02D 70/25; Y02D 70/124; H04B 7/0626; H04B 7/0632; H04B 7/0639; H04B 7/26; H04J 11/00

See application file for complete search history.

(56) References Cited

U.S. PATENT DOCUMENTS

| | | | | |
|---|---|---|---|---|
| 2009/0002147 | A1* | 1/2009 | Bloebaum | H04M 1/6075 340/466 |
| 2009/0132197 | A1* | 5/2009 | Rubin | G01C 21/20 702/141 |
| 2014/0135010 | A1* | 5/2014 | Mohan | H04W 36/0083 455/436 |
| 2014/0146788 | A1 | 5/2014 | Wallentin et al. | |
| 2014/0364126 | A1* | 12/2014 | Fukuta | H04W 36/32 455/438 |
| 2015/0208301 | A1* | 7/2015 | Ueda | H04W 36/00835 455/444 |
| 2017/0251391 | A1* | 8/2017 | Kinthada Venkata | H04L 67/12 |
| 2018/0288604 | A1 | 10/2018 | Ly et al. | |

OTHER PUBLICATIONS

Qualcomm Incorporated, "Uplink Based Mobility Physical Channels", 3GPP DRAFT, R1-166387, 3<sup>rd</sup> Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 5 pages, XP051125354, Retrieved from the Internet: url:http://www.3gpp.org/ftp/Meetings3GPPSYNC/RAN1%20/Docs/ [retrieved on Aug. 21, 2016].

"Qualcomm Incorporated, "DL and UL Based Mobility Procedures", 3GPP Draft, R1-166386, 3rd Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 4 pages, XP051125353, Retrieved from the Internet: URL:http://www.3gpp.org/ftp/Meetings3GPPSYNC/RAN1/Docs/ [retrieved on Aug. 21, 2016]".

Qualcomm Incorporated: "Mobility Procedures—Decision Points and Measurements", 3GPP Draft; R2-165567, 3rd Generation Partnership Project (3GPP), Mobile Competence Centre, 650, Route Des Lucioles, F-06921, Sophia-Antipolis Cedex, France, vol. RAN WG2, No. Gothenburg, Sweden; Aug. 21, 2016, XP051127011, Retrieved from the Internet: URL:http://www.3gpp.org/ftp/Meetings_3GPP_SYNC/RAN2/Docs/ [retrieved on Aug. 21, 2016], 3 pages.

* cited by examiner

TECHNIQUES FOR MOBILITY MODE SELECTION IN UPLINK-BASED AND DOWNLINK-BASED MOBILITY

CROSS-REFERENCE TO RELATED PATENT APPLICATIONS

This application is a continuation of U.S. application Ser. No. 16/001,527, entitled "TECHNIQUES FOR MOBILITY MODE SELECTION IN UPLINK-BASED AND DOWNLINK-BASED MOBILITY" and filed on Jun. 6, 2018, which is a continuation of U.S. application Ser. No. 15/462,574, entitled "TECHNIQUES FOR MOBILITY MODE SELECTION IN UPLINK-BASED AND DOWNLINK-BASED MOBILITY" and filed on Mar. 17, 2017, which claims the benefits of U.S. Provisional Application Ser. No. 62/399,885, entitled "TECHNIQUES FOR MOBILITY MODE SELECTION IN UPLINK-BASED AND DOWNLINK-BASED MOBILITY" and filed on Sep. 26, 2016, and U.S. Provisional Application No. 62/402,833, entitled "METHOD AND APPARATUS OF MOBILITY MODE SWITCH IN UPLINK BASED MOBILITY" and filed on Sep. 30, 2016, all of which are expressly incorporated by reference herein in their entirety.

BACKGROUND

Aspects of the present disclosure relate generally to wireless communications systems, and more particularly, to techniques for mobility mode selection in uplink-based and downlink-based mobility in wireless communications systems (e.g., 5G New Radio).

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information.

In addition, as the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, reduced latency, power savings, and better resource utilization, new approaches may be desirable to improve the system design and reliability. In addition, there are needs to allow for an uplink mobility mode and/or a downlink mobility mode to address mobility and/or different channel conditions that impact a wireless communications system. In this case, new or improved mobility mode selection or switch procedures for inter-zone mobility and/or intra-zone mobility may be desired to improve user experience in wireless communications (e.g., 5G NR).

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to mobility mode selection for a user equipment (UE) in a wireless communications system is provided. The method includes determining that a UE is operating in a first mobility mode; determining whether the UE satisfies at least one condition associated with mobility of the UE for mobility mode selection; and selecting a second mobility mode based on a determination that the UE satisfies the at least one condition, wherein each of the first mobility mode and the second mobility mode is an uplink (UL) mobility mode or a downlink (DL) mobility mode.

In an aspect, an apparatus for wireless communications is provided. The apparatus for wireless communications may include a memory configured to store instructions; and at least one processor communicatively coupled with the memory, wherein the at least one processor is configured to execute the instructions to: determine that the apparatus is operating in a first mobility mode; determine whether the apparatus satisfies at least one condition associated with mobility of the apparatus for mobility mode selection; and select a second mobility mode based on a determination that the apparatus satisfies the at least one condition, wherein each of the first mobility mode and the second mobility mode is an uplink (UL) mobility mode or a downlink (DL) mobility mode.

In another aspect, an apparatus for wireless communication is provided. The apparatus for wireless communications may include means for determining that the apparatus is operating in a first mobility mode; means for determining whether the apparatus satisfies at least one condition associated with mobility of the apparatus for mobility mode selection; and means for selecting a second mobility mode based on a determination that the apparatus satisfies the at least one condition, wherein each of the first mobility mode and the second mobility mode is an uplink (UL) mobility mode or a downlink (DL) mobility mode.

In a further aspect, a computer-readable medium (e.g., a non-transitory computer-readable storage medium) is provided and includes code executable by one or more processors to perform the operations of methods described herein. The computer-readable medium may include code executable by at least one processor to: determine that a user equipment (UE) is operating in a first mobility mode; determine whether the UE satisfies at least one condition associated with mobility of the UE for mobility mode selection; and select a second mobility mode based on a determination that the UE satisfies the at least one condition, wherein each of the first mobility mode and the second mobility mode is an uplink (UL) mobility mode or a downlink (DL) mobility mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
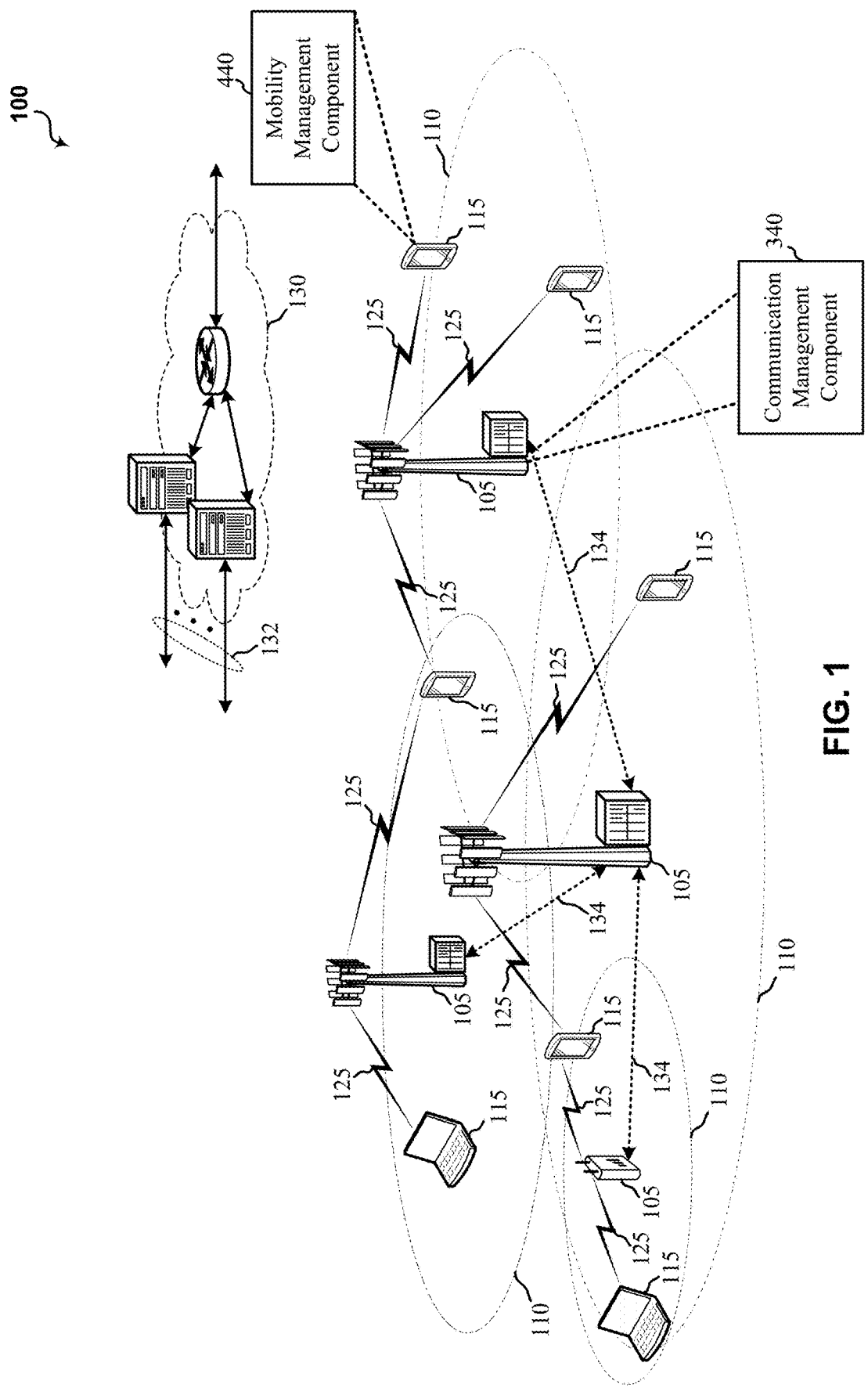
FIG. 1 is an example of a wireless communications system including at least one network entity in communication with at least a user equipment (UE), according to one or more of the presently described aspects.

Some conventional wireless communications systems, such as a long term evolution (LTE) system or a high-speed packet access (HSPA) system, may use downlink-based mobility procedures to change a serving cell of a user equipment (UE). In an example of a downlink-based mobility procedure, the UE may measure downlink signals from a serving cell and/or one or more neighbor cells. The UE and/or the network may then determine whether the UE may change cells based on the quality of the downlink signals. In some cases, a downlink-based mobility procedure may not be ideal for a UE. For example, for downlink-based mobility, the UE may periodically perform cell search and measurements based on reference signals transmitted by the network, some of the processing requirements for the handover decisions are shifted to the UE. As a result, the UE (e.g., a smart phone operating on limited battery supply) may expend greater processing time, and thus require increased power consumption.

In some aspects, a wireless communications (e.g., 5G NR) may use uplink-based mobility procedure to alleviate power requirement concerns associated with the downlink-based mobility procedures. In uplink-based mobility procedures, one or more base stations in the network may measure a signal transmitted by the UE. In an aspect, the network may determine whether to change the serving cell for the UE.

Similar downlink-based and uplink-based mobility procedures may be adopted for zone mobility where a UE may transition from a serving zone to a target zone based on the measured signal quality between the UE and a serving base station. A zone may refer to a group or combination of cells that act together and are synchronized. Thus, a zone may include a plurality of cells operating on the same frequency and/or with the same timing, etc., such that a handover from one cell to another within the zone may be controlled by the network and be transparent to the UE. In some conventional systems, for inter-zone mobility (e.g., UE transitioning from a first zone to a second zone), triggered by either downlink-based mobility procedures or uplink-based mobility procedures, a UE is required to perform a blind zone search. In an aspect, a blind zone search may require the UE to measure and compare the signal qualities of one or more (e.g., all) available zones prior to selecting a target zone for transition. Such expansive blind search requirements for inter-zone mobility may, in some cases, be unnecessary and also may adversely impact the UE power consumption.

In a wireless communications system (e.g., a 5G NR system), a network may support various mobility procedures that may be beneficial in various conditions (e.g., a speed of a UE, channel condition(s), a location of the UE, and/or a radio resource control (RRC) state of the UE). For example, a UE may move at a high speed, a low speed, or be stationary. In another example, the UE may be at a cell edge or a zone edge. Additionally, in some examples, a UE may operate in one or more RRC states, and may transition from one RRC state to another RRC state. As such, to improve system reliability and the performance of the wireless communications system, new or improved mobility mode selection procedures or schemes may be desirable to help the UE and/or the network to select, switch, or operate in an appropriate mobility mode (e.g., downlink-based mobility or uplink-based mobility) in different conditions.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

Described herein are various aspects related to a wireless communications system (e.g., 5G NR system), in particular, techniques for mobility mode selection in uplink (UL)-based and/or downlink (DL)-based mobility. In some aspects, a mobile device (e.g., a UE) may select and/or operate in a different mobility mode to improve the performance of wireless communications using the present disclosure of mobility mode selection procedure. In some examples, a network (or a network entity in a network) may support both UL-based and DL-based mobility simultaneously. In some examples, a UL mobility mode and a DL mobility mode may be adaptively selected by a UE and/or a network. In an aspect, DL-based mobility is used in some conventional wireless communications systems (e.g., the 3rd Generation (3G) network and/or the 4th Generation (4G) network) and may include a network sending reference signals (RS), a UE performing cell search and/or measurements, and/or the network making decisions for cell (re)selections. In another aspect, UL-based mobility may include a UE sending RS and the network performing UE search and/or measurements. In some examples, UL-based mobility may be used in some conventional wireless communications systems (e.g., 3G or 4G system), or a future wireless communications system (e.g., 5G NR system).

In some aspects, UL-based mobility may enable more flexible power consumption-to-reliability tradeoff for a UE, faster layer 1 (L1) handshake to provide both the UE and the network with improved and/or timely information on a specific channel, and/or improved mobility tracking when more antennas are available at the network. In some examples, UL-based mobility may have benefits when a UE is at high mobility and/or with a poor channel condition. In particular, for example, using UL-based mobility may reduce UE power consumptions, reduce paging miss-and-call setup delay, reduce network resource (RS and paging) utilization, and/or reduce handover failure rate. On the other hand, for example, DL-based mobility may have benefits when a UE is at low mobility and/or benign/good channel conditions.

Generally, conventional technologies utilize a DL-based mobility procedure regardless of the UE mobility state. For example, in a 5G NR system, a network may support various mobility procedures that may be beneficial in various conditions. A DL mobility mode may involve the UE measuring signals from one or more cells and the UE or network selecting a serving cell based on the UE measurements. A UL mobility mode may involve the UE transmitting one or more UL measurement indication signals that the network uses to determine a serving cell for the UE. In UL-based mobility, cells may be organized into synchronized groups referred to herein as zones. The cells within a zone may form a single frequency network (SFN). One cell within the zone may be selected as the serving cell for a UE, and the UE may not need to be aware of which cell within the zone is the serving cell. Instead, the UE may treat the zone as a serving zone. In some examples, UL-based mobility procedures for intra-zone mobility and inter-zone mobility may be different.

In some aspects related to UL-based mobility, a UE may be in a zone which includes a collection of tightly synchronized cells. In some examples, the zone may be a super cell with a plurality of synchronized cells. In an aspect, intra-zone mobility may be transparent to UE(s). In an example of intra-zone mobility, a UE may send one or more UL mobility reference signals (e.g., Physical Uplink Measurement Indication Channel (PUMICH) or Physical Uplink Measurement Reference Signal (PUMRS)) for mobility tracking at the network. In response, the network may decode the received one or more reference signals and acknowledge (ACK) UL mobility reference signal(s) and/or signaling paging indicator(s) received from the UE. For example, the network may send a Physical Keep-Alive Channel (PKACH) for acknowledging UL mobility reference signal(s) and/or signaling paging indicator(s). In some examples, the PKACH may be sent or transmitted using a physical (PHY) layer procedure. In an aspect of intra-zone mobility, the network may autonomously select a serving cell or a transmission/reception point (TRP), or cells (e.g., target cells) or TRPs to send PKACH to one or more UEs. For example, the network may autonomously select one or more serving cells for one or more UEs when the one or more UEs are in a high-speed train.

In accordance with various aspects of the present disclosure, the PUMICH may include the same UE identification (ID) as the UE-ID used in the source zone, a new UE-ID which may be assigned by the target zone and sent over an interface by the source zone to the target zone, or an initial access UE-ID which may be used when a UE accesses a zone for the first time. In some aspects, the initial access UE-ID may be either randomly generated or signaled by system information or hard-coded in a specification.

In some aspects related to inter-zone mobility, a UE may perform inter-zone handover when one or more conditions is/are satisfied. For example, inter-zone mobility may be triggered when one or more (e.g., a set of) mobility trigger conditions is/are satisfied (e.g., signal quality of the channel falling below a threshold). In some examples, inter-zone mobility may be triggered by the UE based on a UL-based mobility procedure. However, prior to performing a cell/zone search and/or a cell/zone reselection, the UE may transition to the DL-based mobility procedures to verify the authenticity of the inter-zone mobility trigger conditions and for zone/cell ranking. In an aspect, upon verification and initiating a transition to the target cell or zone, the UE may return to performing UL-based mobility procedures in order to minimize the processing requirements of the UE.

To support UL-based mobility, the network may provide one or more synchronization signals and reference signals. The one or more signals provided by an individual cell may depend on the mobility modes supported by the network or the individual cell. Generally, a cell that supports DL-based mobility may transmit a cell-specific synchronization (SYNC) signal so that a UE may discover one or more neighbor cells. A cell that supports UL-based mobility may transmit at least a zone-specific measurement reference signal so that a UE may measure the zone, which may be identified by a serving cell. In an aspect, a cell that supports UL-based mobility may also transmit a zone-specific SYNC signal so that the UE may discover the zone, for example, as a neighbor zone for inter-zone mobility.

As discussed above, in some conventional systems, for inter-zone mobility, a UE may be required to perform a blind zone search. A blind zone search may require the UE to measure the signal qualities of one or more (e.g., all) available zones prior to selecting a target zone for transition, and thus waste valuable resources (e.g., power and processing time). The present disclosure provides techniques that minimize the blind search requirements for the UE during inter-zone mobility by configuring the network to transmit a neighbor list (e.g., a neighbor zone list and/or a neighbor cell list) to the UE that identifies a subset of neighbor zones and/or neighbor cells from a list of all available zones and cells that the UE may consider. By considering only a subset of zones and cell identified in the neighbor list, the UE may search for SYNC signals corresponding to only the identified zones and/or cells included in the neighbor list, while disregarding the SYNC signals from other zones or cells. As such, the UE may limit the number of neighbor zones and/or cells for which the UE measures and compares the power difference (e.g., power difference between the serving zone/cell and potential target neighbor zone/cell) in verifying inter-zone mobility trigger conditions, and thereby conserve power. In some examples, in addition or alternative to the neighbor zone list and/or neighbor cell list, the neighbor list may include information associated with neighbor radio access technologies (RATs), neighbor frequency information, or a combination of one or more of the above neighbor information.

Additionally or alternatively, aspects of the present disclosure provide techniques for dynamically switching mobility mode (e.g., DL-based mobility or UL-based mobility) of the UE based on one or more conditions. For example, if a UE moves at a high speed (e.g., the UE is in a car), to be more efficient, the UE may be configured to switch to a UL mobility mode in order to take advantage of more robust mobility performance and improved paging performance. In contrast, if the UE is stationary or slowly moving (e.g., a user is walking with the UE), then the aspects of the present disclosure may switch the UE to DL mobility mode for improved efficiency. In further examples, UEs located at a zone edge, may be better served by DL mobility mode than UL mobility mode because in DL mobility mode, the UE may compare more than one DL reference signals coming from different access nodes or TRPs. In such a situation, the UE may determine the mobility of the UE without the interworking between the source and the target base stations, and thus reduce the network complexity.

Therefore, in some aspects, the UE may dynamically switch from a UL mobility mode to a DL mobility mode if the UE is located at the zone edge (e.g., when UE is moving into another zone coverage and/or a cell coverage). Additionally or alternatively, the UE may switch from a UL mobility mode to a DL mobility mode if the UE mobility speed is less than a mobility threshold. In contrast, the UE may also dynamically switch from a DL mobility mode to a UL mobility mode if, for example, the UE mobility speed exceeds the mobility threshold. In some aspects, the UE speed may be estimated based on the Doppler estimation, number of serving TRPs that change in a certain time period, or speed given by the other mean such as a GPS or a speed sensor embedded in the UE.

In some aspects as discussed above, a UE may operate in one or more radio resource control (RRC) states, and may transition from one RRC state to another RRC state. These RRC states may be included in two modes, a Connected Mode and an Idle Mode. In some examples, a Connected Mode may include, but not limited to, an RRC-DEDICATED state and/or an RRC-COMMON state. In some examples, an Idle Mode may include, but not limited to, a REACHABLE-IDLE state (or an RRC-IDLE state) and/or a power saving mode. In an aspect, when a UE is in an RRC-IDLE state, there may be no UE context in a radio access network (RAN), no assigned air interface resources for the UE, and the UE may only transmit and receive small data. In another aspect, when a UE is in a power saving mode, there may be no UE context in the RAN, no assigned air interface resources for the UE, and the UE has no data transmissions or receptions. In an aspect, when a UE is in an RRC-COMMON state, there may be UE context in a RAN, no assigned air interface resources for the UE, and the UE may only transmit and receive small data. In another aspect, when a UE is in an RRC-DEDICATED state, a RAN may have the UE context, the UE may have been assigned air interface resources, and the UE may transmit and receive any data.

The present disclosure includes aspects that address mobility mode selection procedures for a UE. In some implementations of the present disclosure, the UE may operate in one RRC state or the UE may transition from one RRC state to another RRC state. For example, when the UE is in an RRC-IDLE state, the UE may select or operate in DL mobility mode. When the UE is in an RRC-COMMON state or an RRC-DEDICATED state, the UE may select or operate in DL mobility mode or in UL mobility mode. In some examples, the UE may select or operate in only one mobility mode, either DL mobility mode or UL mobility mode. In some examples, a UE may perform either UL-based or DL-based mobility at a given time. For instance, the UE may perform DL-based mobility when the UE is in low mobility and/or benign/good channel conditions, and/or perform UL-based mobility when the UE is in high mobility and/or poor channel conditions. As such, a mobility mode selection procedure may be needed for the UE to select or operate in an appropriate mobility mode. In some examples, the network may have capability of supporting both UL-based and DL-based mobility simultaneously or adaptively. For example, in an aspect, the network or a network entity may support both UL-based mobility and DL-based mobility at the same time. In another aspect, the network or the network entity may select, choose or determine a UL-based mobility or a DL-based mobility based on the information at the network or the network entity or received from one or more UEs.

In some implementations of the present disclosure, mobility mode selection may depend on side information at UE or at network. The side information may include, for example, a speed of the UE, signal measurements, locations, etc. In other implementations of the present disclosure, one or more parameters related to mobility mode selection (e.g., a speed threshold) may be signaled from the network to one or more UEs in one or more Minimum System Information Blocks (MSIB).

According to the present disclosure, some examples relate to selecting a mobility mode when a UE is transitioning from an RRC-IDLE state to an RRC-DEDICATED state. In one example implementation, a UE may predict a preferred mobility mode (e.g., based on measurements and/or identified information) and include a mobility mode recommendation in PUSCH carrying message 3 (e.g., MSG3) of a random access procedure. In an aspect, for example, the network may send a mobility mode configuration for the UE in PDCCH/PDSCH carrying message 4 (e.g., MSG4) of a random access procedure, in response to the received mobility mode recommendation. In another example implementation, the UE may continue operating or performing the mobility mode (e.g., DL mobility mode) which is being used currently in the RRC-IDLE state.

Additionally, according to the present disclosure, some examples relate to selecting a mobility mode when a UE is in an RRC-DEDICATED state. In one example implementation, the UE and the network may handshake to select the mobility mode through dedicated RRC messages. In some other example implementations, the UE and the network may handshake or use layer procedures at an L1 layer (e.g., physical layer) or at an L2 layer (e.g., a media access control (MAC) layer) to select the mobility mode (e.g., UL-based or DL mobility mode).

According to the present disclosure, some examples relate to selecting a mobility mode when a UE is transitioning from an RRC-DEDICATED state to an RRC-COMMON state. In one example implementation, the UE may continue operating or performing the mobility mode (e.g., UL-based or DL mobility mode) which is being used in the RRC-DEDICATED state. In some other implementations, a mobility mode switching may be performed. For example, the mobility mode switching may be part of an RRC reconfiguration procedure (e.g., using RRC reconfiguration message(s)).

Additionally, according to the present disclosure, some examples relate to selecting a mobility mode when a UE is transitioning from an RRC-COMMON state to an RRC-DEDICATED state. In one example implementation, the UE may continue operating or performing the mobility mode (e.g., UL-based or DL mobility mode) which is being used in the RRC-COMMON state. In another example implementation related to a UE-driven mobility mode switching, the UE may initiate the mobility mode switching. For example, the UE-driven mobility mode switching may be part of an RRC connection setup request from the UE (e.g., UE sends an RRC connection setup request message). In one example implementation related to a network-driven mobility switching, the network (e.g., a network entity, a base station, or an eNB) may initiate the mobility switching via paging, which, for example, may be part of the network RRC connection setup. In some examples, the network may be aware of UE's current RRC state and/or a target RRC state of the UE through, for example, RRC connection/reconnection message(s).

According to the present disclosure, some examples relate to selecting a mobility mode when a UE is in an RRC-COMMON state. In one example implementation related to a network-driven mobility switching, the network may page the UE information or indications related to mobility mode support change, based on side information and/or determinations at the network (e.g., estimation of a UE speed based on a serving change frequency).

In another example implementation related to a UE-driven mobility mode switching (e.g., switching between a UL mobility mode and a DL mobility mode) when the UE is in an RRC-COMMON state (e.g., in FIG. 16A), the UE may send a mobility mode request signal or message. In some examples, the mobility mode request signal or message may include random access channel (RACH) information, UE identification (e.g., UE-ID), and/or mobility mode information in one bit or multiple bits (e.g., mobility mode switching indication, a target or preferred mobility mode, or both). In an aspect, the network may send a PKACH to acknowledge receiving the request signal/message. The network may also send a mobility mode indicator in response to the request signal/message. In one example implementation, the mobility mode indicator may comprise one-bit information indicating whether the network accepts the mobility mode switching request sent from the UE. In some example implementations, there is no paging indicator embedded in the PKACH. In some other example implementations, the UE may optionally send a signal to the network to inform the request completion.

In one example implementation related to a UE-driven mobility mode switching (e.g., switching from a UL mobility mode to a DL mobility mode) when the UE is in an RRC-COMMON state (e.g., in FIG. 16B), the UE may send a mobility mode request signal or message. In some examples, the mobility mode request signal or message may include random access channel (RACH) information, UE identification (e.g., UE-ID), and/or mobility mode information in one bit or multiple bits (e.g., mobility mode switching indication, a target or preferred mobility mode, or both). In an aspect, the network may send a PKACH to acknowledge receiving the request signal/message. The network may also send a mobility mode indicator in response to the request signal/message. In one example implementation, the mobility mode indicator may comprise one-bit information indicating whether the network accepts the mobility mode switching request sent from the UE. In some example implementations, the UE may be aware of one or more zones (with a plurality of cells) in the network, but not aware of a certain cell or cells for communications. In this case, the network may optionally send a Physical Cell ID Channel (PCICH) to the UE to inform or indicate one or more cell identifications (e.g., Cell ID(s)), and the UE may use the informed or indicated one or more cell identifications for mobility mode switching, for example, from a UL mobility mode to a DL mobility mode. In some examples, the network may send a mobility mode configuration response via a Physical Downlink Control Channel (PDCCH) or a Physical Downlink Shared Channel (PDSCH). The UE may then decode the data or signals received over PDCCH/PDSCH using, for example, a Mobility Indication-Radio Network Temporary Identifier (MI-RNTI), and therefore, the UE may not be need to go into or switch to an RRC-DEDICATED state to decode the received PDCCH/PDSCH.

Various aspects are now described in more detail with reference to the FIGS. 1-20. Each of the aspects described above may be performed or implemented in connection with at least one figure in FIGS. 1-20. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

FIG. 1 illustrates an example of a wireless communications system 100 in accordance with various aspects of the present disclosure. The wireless communications system 100 may include one or more base stations 105, one or more UEs 115, and a core network 130. The core network 130 may provide user authentication, access authorization, tracking, interne protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, transmit/receive point (TRP), a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 may be or include a Long Term Evolution (LTE) or LTE-Advanced (LTE-A) network. The wireless communications system 100 may also be a next generation network, such as a 5G wireless communication network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a term in the 3rd Generation Partnership Project (3GPP) that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. In some aspects, a UE 115 may be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communications system, a medical device, a vending machine, a device for the Internet-of-Things, or any other similar functioning device. A UE 115 may be able to communicate with various types of base stations and network equipment including macro eNBs, small cell eNBs, relay base stations, and the like.

The wireless communication links 125 shown in wireless communications system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communications system 100, the wireless communications system 100 may have a UE-centric MAC layer. On the network side, the base stations 105 may broadcast a synchronization (SYNC) signal. The SYNC signal may be a unified SYNC signal that is supported by systems using a UE-centric MAC layer (UECM) (e.g., UECM networks) as well as systems using a network-centric or non UE-centric MAC layer (nUECM) (e.g., nUECM networks). The UEs 115 may receive the SYNC signal, acquire a timing of the network from the SYNC signal, and in response to acquiring the timing of the network, transmit a pilot signal. The pilot signal transmitted by a UE 115 may be concurrently receivable by a plurality of cells (e.g., base stations) within the network. Each of the plurality of cells may measure a strength of the pilot signal, and the network (e.g., one or more of the base stations 105 and/or a central node within the core network 130) may determine a serving cell for the UE 115. As the UE 115 continues to transmit a pilot signal, the network may handover the UE 115 from one serving cell to another, with or without informing the UE 115. System information may be transmitted to UEs 115 on-demand (e.g., in response to a UE 115 transmitting a pilot signal), thus enabling the network to forego broadcasting the system information and enabling the network to conserve power.

The SYNC signal transmitted by the base stations 105 being unified, however, may not identify a given cell, but rather may identify a zone of multiple cells operating on the same frequency and/or with the same timing, etc., as described further herein. There may be instances, however, where a UE 115 may benefit from knowing cell identifiers of a serving cell, a neighboring cell, etc. Accordingly, in an example, the base stations 105 may also separately transmit one or more cell-specific signals, such as measurement reference signals (MRS), which may be scrambled based on a cell identifier, one or more cell-specific SYNC signals, which may be generated based on a sequence that indicates the cell identifier, etc., and UE 115 can receive the one or more cell-specific signals from one or more base stations 105 and identify corresponding cells based at least in part on determining the cell identifier that corresponds to the one or more cell-specific signals (e.g., based on determining an MRS scrambling code, cell-specific SYNC signal sequence, etc.). In another example, the cell determined as the serving cell for the UE 115, as described above, may transmit the one or more cell-specific signals (e.g., in response to the pilot signal from the UE 115) to facilitate serving cell discovery by the UE 115.

In some aspects of the wireless communications system 100, a base station 105 may include a communication management component 340 for maintaining a neighbor list associated with the UE 105. The neighbor list may be either neighbor zone list identifying a subset of zones that may be available and near the UE 105 and/or neighbor cell list identifying a subset of cells that may be available to the UE 105. In some aspects, when the neighbor zone list is empty, the UE 105 may be able to deduce that only cell transition is available. In some examples, the base station 105 may transmit the neighbor list to the one or more UEs 105 in order to aid the UEs 105 to reduce the blind zone search performed by the UE 105. The base station 105 may also indicate, by the communication management component 340, the set of supported mobility modes using a physical broadcast channel (PBCH). The PBCH may be a zone-specific PBCH or a cell-specific PBCH. A zone-specific PBCH may be synchronously transmitted by each cell within a zone and may be the same signal for each of the cells in the zone. The zone-specific PBCH may include information applicable to all of the cells in the zone. A cell-specific PBCH may be transmitted by an individual cell and may include information unique to the individual cell.

In some aspects of the wireless communications system 100, a UE 115 may include a mobility management component 440 configured to perform inter-zone mobility and/or intra-zone mobility in accordance with techniques described herein. In some examples, the UE 115 may transition between a set of mobility modes (e.g., DL-based mobility or UL-based mobility) based on one or more conditions detected by the UE (e.g., whether zone/cell transition trigger conditions have been satisfied). The UE 115, and more particularly the mobility management component 440, may be aided in limiting the number of zones and/or cells for which the UE 115 measures power difference for (e.g., comparing the power difference between serving zone/cell and target zone/cell) by receiving a neighbor list from the base station 105. In some examples, the base station 105 may transmit (e.g., broadcast) the network list based on an event trigger (e.g., if the neighbor list changes based on position of the UE 115 in the coverage area 110 or if one or more zone transition conditions are satisfied). Alternatively, the network list may be transmitted by the base station 105 on a periodic basis using minimum system information blocks (SIBs).

In some examples, the mobility management component 440 may also be configured to detect a cell ID or a zone ID based on at least one downlink signal transmitted by a cell. In an aspect, the mobility management component 440 may detect a primary synchronization signal (PSS) and a secondary synchronization signal (SSS) to determine an identifier. In an aspect, the identifier may be a zone ID. In another aspect, the mobility transition component 440 may also detect a cell-specific secondary synchronization signal (SSS-C). The mobility transition component 440 may determine a cell ID based on a combination of the PSS, SSS, and SSS-C as described in further detail below. The mobility management component 440 may also synchronize a receiver of the UE 115 with the cell and determine a time/frequency offset.

Figure 2:
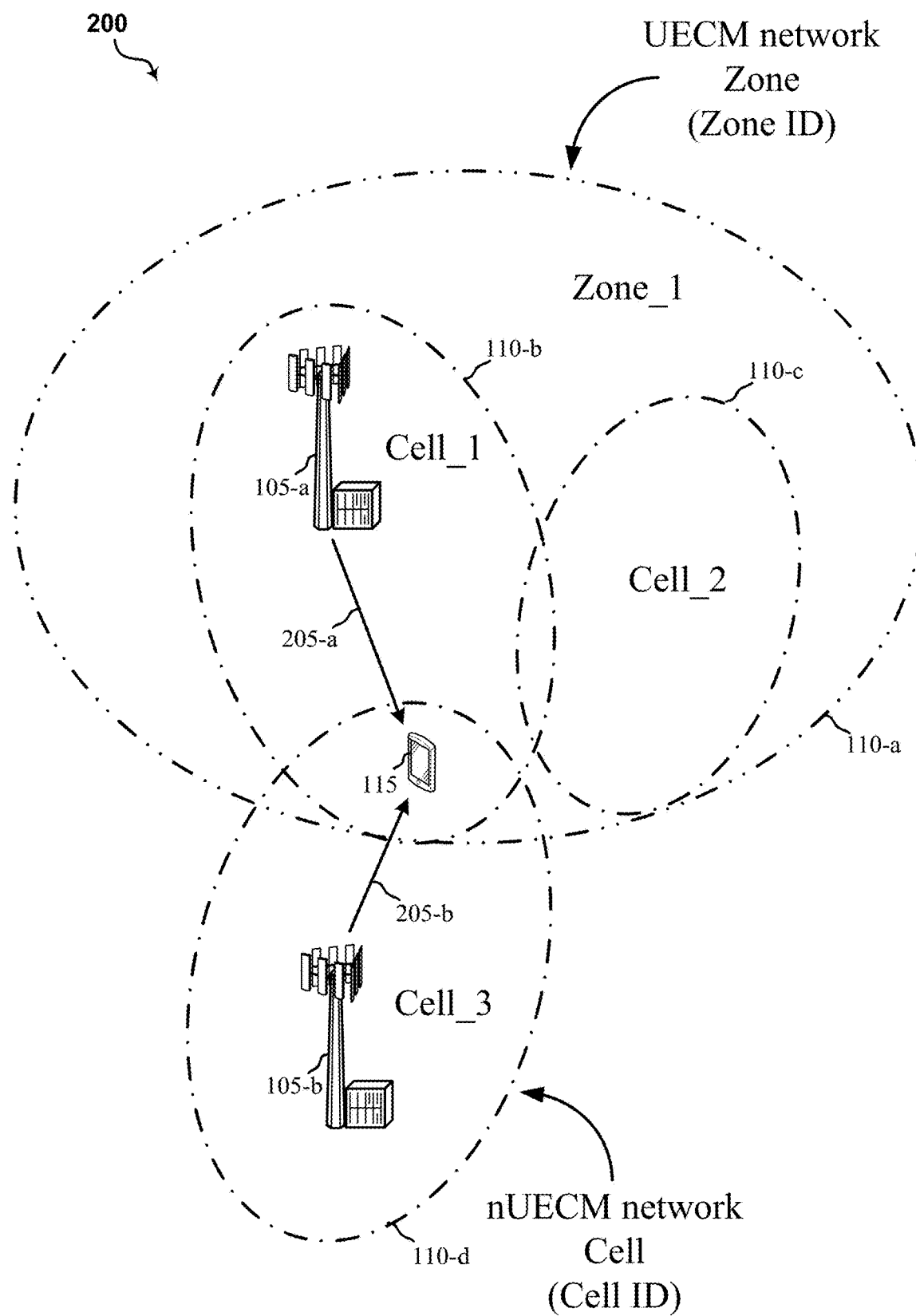
FIG. 2 is an example of a zone of cells in a network with at least a UE-centric MAC layer, according to one or more of the presently described aspects.

FIG. 2 shows a diagram 200 illustrating a UECM network zone (e.g., zone_1) having a coverage area 110-a and including at least a cell_1 having a coverage area 110-b and a cell_2 having a coverage area 110-c. The UECM network zone may be a zone associated with at least a portion of the wireless communications system 100 described in FIG. 1. A zone, such as zone_1, may refer to a group or combination of cells that act together and are highly synchronized. Because of the coordinated operation of the cells in a zone, the SYNC signals are zone-specific. That is, the SYNC signals transmitted (e.g., broadcast) from a zone are typically single-frequency network (SFN) SYNC signals. A single-frequency network is a broadcast network where several transmitters simultaneously send the same signal over the same frequency channel.

The use of zones in 5G networks or other next generation communications systems may be advantageous for mobility management operations. For example, when in a zone, cell reselection may be transparent to a UE. The network may be responsible for cell reselection and mobility, and the UE can be relieved from those responsibilities. Such an approach is not only efficient for the UE, it is also efficient for the network because the number of mobility messages that need to be exchanged with a UE are reduced.

The use of zones in 5G networks or other next generation communications systems may also enable certain applications such as massive MIMO, for example. Massive MIMO, which is also known as Large-Scale Antenna Systems, Very Large MIMO, Hyper MIMO, Full-Dimension MIMO and ARGOS, makes use of a very large number of service antennas (e.g., hundreds or thousands) that are operated fully coherently and adaptively. Extra antennas may help by focusing the transmission and reception of signal energy into smaller regions improving throughput and energy efficiency, in particularly when combined with simultaneous scheduling of a large number of user terminals (e.g., tens or hundreds). Massive MIMO was originally envisioned for TDD operation, but can potentially be applied also in FDD operation. Massive MIMO may provide additional benefits, including the use of inexpensive low-power components, reduced latency, simplification of the MAC layer, and robustness to interference and intentional jamming.

Also shown in FIG. 2 is a UE 115 located in an overlapping area or region between the UECM network zone and a nUECM network cell (e.g., cell_3 having coverage area 110-d). The nUECM network cell may be a cell associated with at least a portion of a wireless communications system having a network-centric MAC layer. The UE 115 in the overlapping area may receive one or more unified SYNC signals from base station 105-a in cell_1 of zone_1 and/or from base station 105-b in cell_3. In other words, the UE 115 in the overlapping area may receive SYNC signals from a UECM network zone (e.g., cell_1 in zone_1) and/or from a nUECM network cell (e.g., cell_3). For example, base station 105-a may generate and transmit (e.g., broadcast), unified SYNC signals, which may identify zone_1 and/or cell_1, as well as a nominal tone spacing being used by zone_1. Moreover, base station 105-b may transmit (e.g., broadcast) unified SYNC signals, which may identify cell_3.

After receiving the unified SYNC signals, whether from a UECM network zone or a nUECM network cell, the UE 115 in the overlapping area may process the unified SYNC signals to determine whether the network transmitting the signals is a UECM network or a nUECM network. The UE 115 may also detect, where the network is a UECM network, a nominal numerology (e.g., tone spacing) being used by the network. The UE 115 may detect the nominal numerology based on a number of copies of the unified SYNC signals received from a UECM network.

In some aspects, the unified SYNC signals may identify the zone, but may not identify the cell from which the signal is transmitted. As such, base station 105-a in cell_1 may also transmit, via communication management component 340 (see e.g., FIG. 3), a cell-specific signal 205-a where the cell-specific signal can indicate a cell identifier of cell_1. Similarly, for example, base station 105-b in cell_3 may also transmit, via a cell-specific signal transmitting component 1340 (see e.g., FIG. 3), a cell-specific signal 205-b where the cell-specific signal can indicate a cell identifier of cell_3. For example, the cell-specific signals may include MRSs that are scrambled using a scrambling code that is associated with the cell identifier. In another example, the cell-specific signals may include cell-specific SYNC signals that are generated using a sequence (e.g., a binary sequence, m-sequence, Zadoff-Chu sequence, etc.) that is associated with the cell identifier. Accordingly, UE 115 can receive the cell-specific signal(s) 205-a and/or 205-b from cell_1 and/or cell_3, and may identify one or more of the cells based on the corresponding cell-specific signal(s). In another example, UE 115 may identify a serving cell as one of cell_1 or cell_3 based on a received cell-specific signal, and/or may determine one or more neighboring cell identifiers, as described herein.

Figure 3:
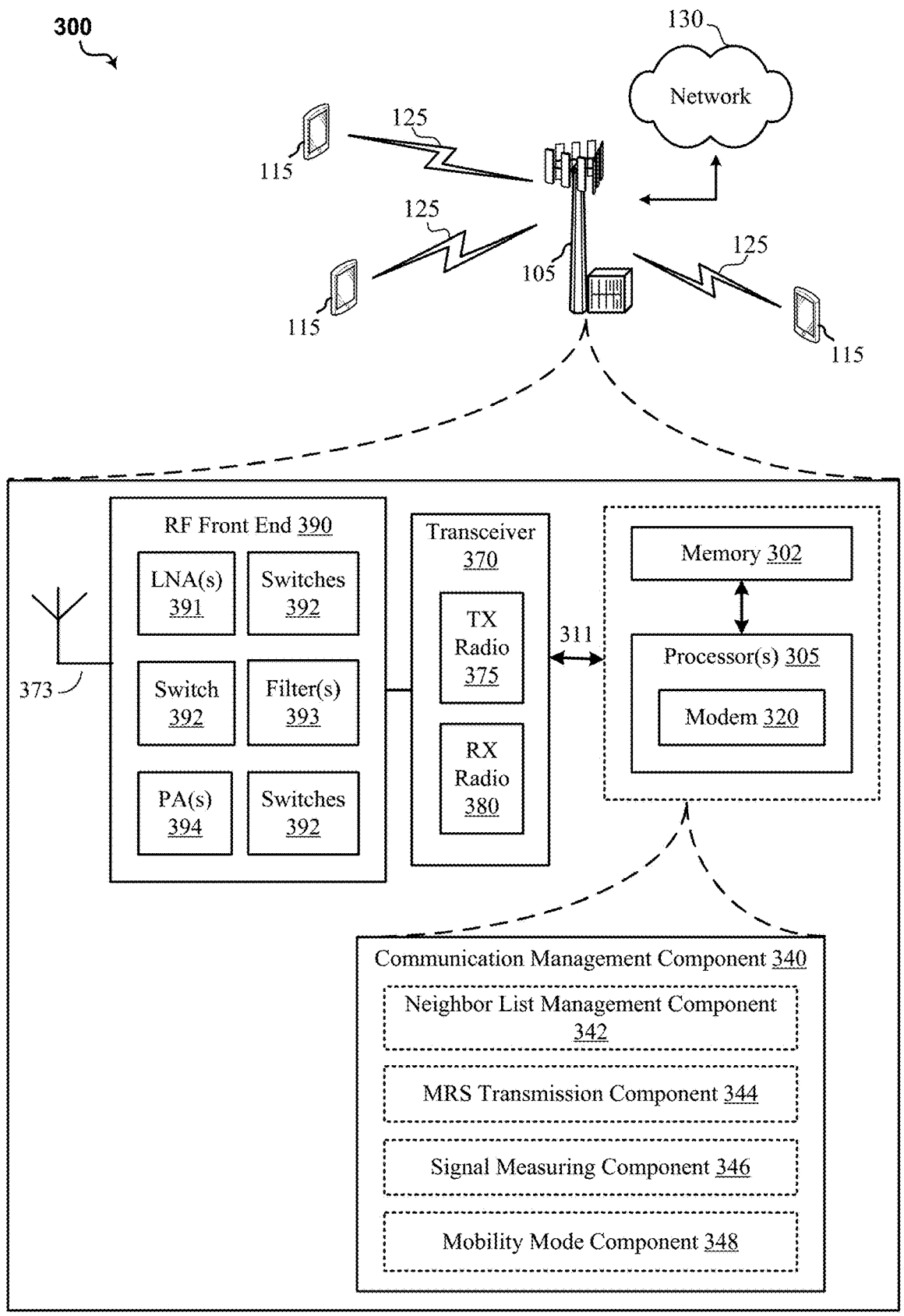
FIG. 3 is a block diagram illustrating an example of a base station configured to perform communication management, according to one or more of the presently described aspects.

Referring to FIG. 3, a system block diagram 300 is shown that includes a portion of a wireless communications system having multiple UEs 115 in communication with a base station 105 via communication links 125, where the base station 105 is also connected to a network 130. In an example, the UEs 115 may be examples of the UEs described in the present disclosure that are configured to perform mobility mode selection and management, and may receive and process one or more unified SYNC signals. Moreover, the base station 105 may be an example of the base stations described in the present disclosure that are configured to perform mobility mode selection and management, and may generate and transmit MRSs and manage neighbor lists for one or more UEs 115. In some aspects, the UE 115 may utilize one or more MRSs and neighbor list information in order to minimize the blind zone search performed by the UE 115 during inter-zone mobility or handover. In some aspects, during intra-zone mobility, the base station 105 may operate or be configured to perform mobility mode selection procedures for a UE 115 based on the current RRC state of the UE 115 or based on a determination that the UE 115 transitions from one RRC state to another RRC state (see, e.g., FIG. 15).

In an aspect, the base station (e.g., the base station 105) in FIG. 3 may include one or more processors 305 and/or memory 302 that may operate in combination with communication management component 340 to perform the functions, methodologies (e.g., method 1700 or method 2000), or methods presented in the present disclosure. In accordance with the present disclosure, the communication management component 340 may include a neighbor list management component 342 that provide a neighbor list to the UE 115. In some examples, the neighbor list may include information such as a list of neighbor zone IDs and zone measurement configuration for the UE 115. Additionally or alternatively, the neighbor list may include neighbor cell information such as neighbor cell IDs and cell measurement configuration. The communication management component 340 may include an optional MRS transmission component 344 configured for scrambling and/or transmitting an MRS to the UE 115 such that the UE 115 may compare the MRS from the serving zone and the MRS from the target zone to determine whether to transition from the serving zone to a target zone. The communication management component 340 may include a signal measuring component 346 configured for measuring a signal received from the UE 115 to determine whether to transmit the MRS. In the situation of UL-based mobility mode, the signal measuring component 346 may measure the one or more reference signals received from the UE 115 in order to perform UE search/measurements and determine whether the UE 115 is a candidate for transitioning to a different zone or cell based on the signal quality measurement derived from the one or more received reference signals.

According to the present aspects, the communication management component 340 may include a mobility mode component 348 to control or communicate with the UE 115 for performing mobility mode management and selection as described herein. For example, the mobility mode component 348 may perform identifying information for mobility mode selection, identifying an RRC state of the UE 115, and/or determining or selecting a UL-based mobility or a DL-based mobility based on some identified information (e.g., the UE 115 is at a cell/zone edge, or the UE 115 is operating at a certain RRC state) at the network, or at the base station 105, or received from one or more UEs (e.g., the UE 115). In an aspect, the mobility mode component 348 of the base station 105 may have capability of supporting both UL-based and DL-based mobility simultaneously or adaptively. For example, the mobility mode component 348 may support or perform both UL-based mobility and DL-based mobility at the same time.

The one or more processors 305 may include a modem 320 that uses one or more modem processors. The various functions related to the communication management component 340, and/or its sub-components, may be included in modem 320 and/or processor 305 and, in an aspect, may be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communication management component 340.

In some examples, the communication management component 340 and each of the sub-components may comprise hardware, firmware, and/or software and may be configured to execute code or perform instructions stored in a memory (e.g., a computer-readable storage medium, such as memory 302 discussed below). Moreover, in an aspect, the base station 105 in FIG. 3 may include a radio frequency (RF) front end 390 and transceiver 370 for receiving and transmitting radio transmissions to, for example, UEs 115. The transceiver 370 may coordinate with the modem 320 to transmit messages generated by the communication management component 340 (e.g., neighbor list information, MRSs, cell-specific SYNC signals, determined or selected mobility mode, PRACH, PKACH, PCICH, PDCCH, PDSCH, etc.) to the UEs 115. RF front end 390 may be connected to one or more antennas 373 and can include one or more switches 392, one or more amplifiers (e.g., power amplifiers (PAs) 394 and/or low-noise amplifiers (LNAs) 391), and one or more filters 393 for transmitting and/or receiving RF signals on downlink channels and/or uplink channels. In an aspect, the components of the RF front end 390 may connect with transceiver 370. The transceiver 370 may be coupled with one or more of the modem 320 and the processor(s) 305.

The transceiver 370 may be configured to transmit (e.g., via transmitter (TX) radio 375) and receive (e.g., via receiver (RX) radio 380) wireless signals through antenna(s) 373 via the RF front end 390. In an aspect, the transceiver 370 may be tuned to operate at specified frequencies such that the base station 105 may communicate with, for example, UEs 115. In an aspect, for example, the modem 320 may configure the transceiver 370 to operate at a specified frequency and power level based on the configuration of the base station 105 and communication protocol used by the modem 320.

The base station 105 in FIG. 3 may further include a memory 302, such as for storing data used herein and/or local versions of applications or communication management component 340 and/or one or more of its sub-components being executed by processor 305. Memory 302 may include any type of computer-readable medium usable by a computer or processor 305, such as random access memory (RAM), read only memory (ROM), tapes, magnetic discs, optical discs, volatile memory, non-volatile memory, and any combination thereof. In an aspect, for example, memory 302 may be a computer-readable storage medium that stores one or more computer-executable codes defining communication management component 340 and/or one or more of its sub-components. Additionally or alternatively, the base station 105 may include a bus 311 for coupling one or more of the RF front end 390, the transceiver 374, the memory 302, or the processor 305, and to exchange signaling information between each of the components and/or sub-components of the base station 105.

Figure 4:
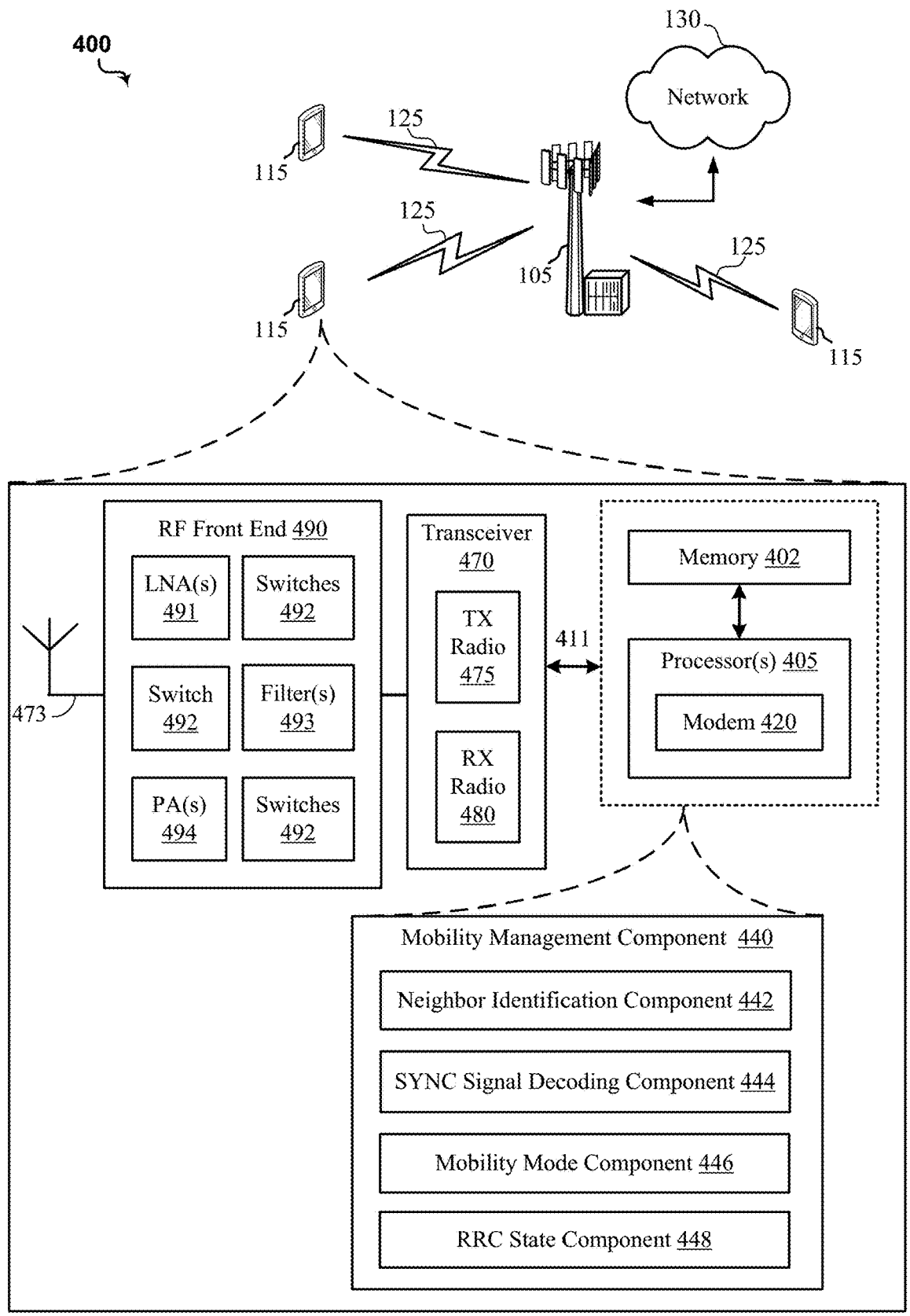
FIG. 4 is a block diagram illustrating an example of a UE configured to perform mobility mode selection and mobility management, according to one or more of the presently described aspects.

Referring to FIG. 4, a block diagram 400 is shown that includes a portion of a wireless communications system having multiple UEs 115 in communication with a base station 105 via communication links 125, where the base station 105 may be connected to a network 130. The UEs 115 may be examples of the UEs described in the present disclosure that are configured to receive and process signals received from the base station 105. In an example, the UEs 115 may be examples of the UEs described in the present disclosure that are configured to perform mobility mode selection and management, and may receive and process one or more unified SYNC signals. In addition, the base station 105 may be an example of the base stations described in the present disclosure that are configured to generate and transmit cell-specific and/or zone-specific signals. Moreover, the base station 105 may be an example of the base stations described in the present disclosure that are configured to perform mobility mode selection and management. In some aspects, the UE 115 may utilize one or more MRSs and neighbor list information in order to minimize the blind zone search performed by the UE 115 during inter-zone mobility or handover. In some aspects, during intra-zone mobility, the UE 115 may operate or be configured to perform mobility mode selection procedures based on the current RRC state of the UE or based on a determination that the UE 115 transitions from one RRC state to another RRC state (see, e.g., FIG. 15).

In an aspect, the UE 115 in FIG. 4 may include one or more processors 405 and/or memory 402 that may operate in combination with mobility management component 440 to perform the functions, methodologies (e.g., methods 1700, 1800, and/or 1900), or methods presented in the present disclosure. In accordance with the present disclosure, the mobility management component 440 may include a neighbor identification component 442 for receiving and processing a neighbor list received from a serving zone/cell that identifies, from a list of available zones/cells, a subset of neighbor zones or cells associated with the UE 115. In an aspect, the mobility management component 440 may include a synchronization (SYNC) signal decoding component 444 for receiving and decoding a SYNC signal from one or more target zones or cells and determining whether the target zone is included in the neighbor list based on the SYNC signal. In some examples, the SYNC signal may include cell-specific ID and/or zone-specific ID that identifies the source of the SYNC signal.

The mobility management component 440 may include a mobility mode component 446 for determining, selecting, and/or transitioning between the DL mobility mode and the UL mobility mode based on satisfaction of one or more conditions (e.g., the signal quality falling below a threshold based on the measurements of the reference signal). In some examples, the one or more conditions may be related to a speed of the UE 115, a speed threshold of the UE 115, a radio condition of the UE 115, location information of the UE 115, or signal measurements of the UE 115. In an aspect, the mobility management component 440 may include an RRC state component 448 for determining or identifying information related to a current RRC state of the UE 115, or information or condition(s) related to the UE 115 transitioning from the current RRC state to another RRC state, as described herein (see, e.g., FIG. 15).

The one or more processors 405 may include a modem 420 that uses one or more modem processors. The various functions related to the mobility management component 440, and/or its sub-components, may be included in modem 420 and/or processor 405 and, in an aspect, may be executed by a single processor, while in other aspects, different ones of the functions may be executed by a combination of two or more different processors. For example, in an aspect, the one or more processors 405 may include any one or any combination of a modem processor, or a baseband processor, or a digital signal processor, or a transmit processor, or a transceiver processor associated with transceiver 470, or a system-on-chip (SoC). In particular, the one or more processors 405 may execute functions and components included in the mobility management component 440.

In some examples, the mobility management component 440 and each of the sub-components may comprise hardware, firmware, and/or software and may be configured to execute code or perform instructions stored in a memory (e.g., a computer-readable storage medium, such as memory 402 discussed below). Moreover, in an aspect, the UE 115 in FIG. 4 may include an RF front end 490 and transceiver 470 for receiving and transmitting radio transmissions to, for example, base stations 105. The transceiver 470 may coordinate with the modem 420 to receive cell-specific and/or zone-specific signals to be processed by the mobility management component 440. RF front end 490 may be connected to one or more antennas 473 and can include one or more switches 492, one or more amplifiers (e.g., PAs 494 and/or LNAs 491), and one or more filters 493 for transmitting and receiving RF signals on uplink channels and downlink channels. In an aspect, the components of the RF front end 490 may connect with transceiver 470. The transceiver 470 may connect to one or more of modem 420 and processors 405.

The transceiver 470 may be configured to transmit (e.g., via transmitter (TX) radio 475) and receive (e.g., via receiver (RX) radio 480) wireless signals through antennas 473 via the RF front end 490. In an aspect, the transceiver 470 may be tuned to operate at specified frequencies such that the UE 115 can communicate with, for example, base stations 105. In an aspect, for example, the modem 420 can configure the transceiver 470 to operate at a specified frequency and power level based on the configuration of the UE 115 and communication protocol used by the modem 420.

The UE 115 in FIG. 4 may further include a memory 402, such as for storing data used herein and/or local versions of applications or the mobility management component 440 and/or one or more of its sub-components being executed by processor 405. Memory 402 may include any type of computer-readable medium usable by a computer or processor 405, such as RAM, ROM, tapes, magnetic discs, optical discs, volatile memory, non-volatile memory, and any combination thereof. In an aspect, for example, memory 402 may be a computer-readable storage medium that stores one or more computer-executable codes defining mobility management component 440 and/or one or more of its sub-components. In an aspect, for example, memory 402 may be a non-transitory computer-readable storage medium. Additionally or alternatively, the UE 115 may include a bus 411 for coupling one or more of the RF front end 490, the transceiver 474, the memory 402, or the processor 405, and to exchange signaling information between each of the components and/or sub-components of the UE 115.

Figure 5:
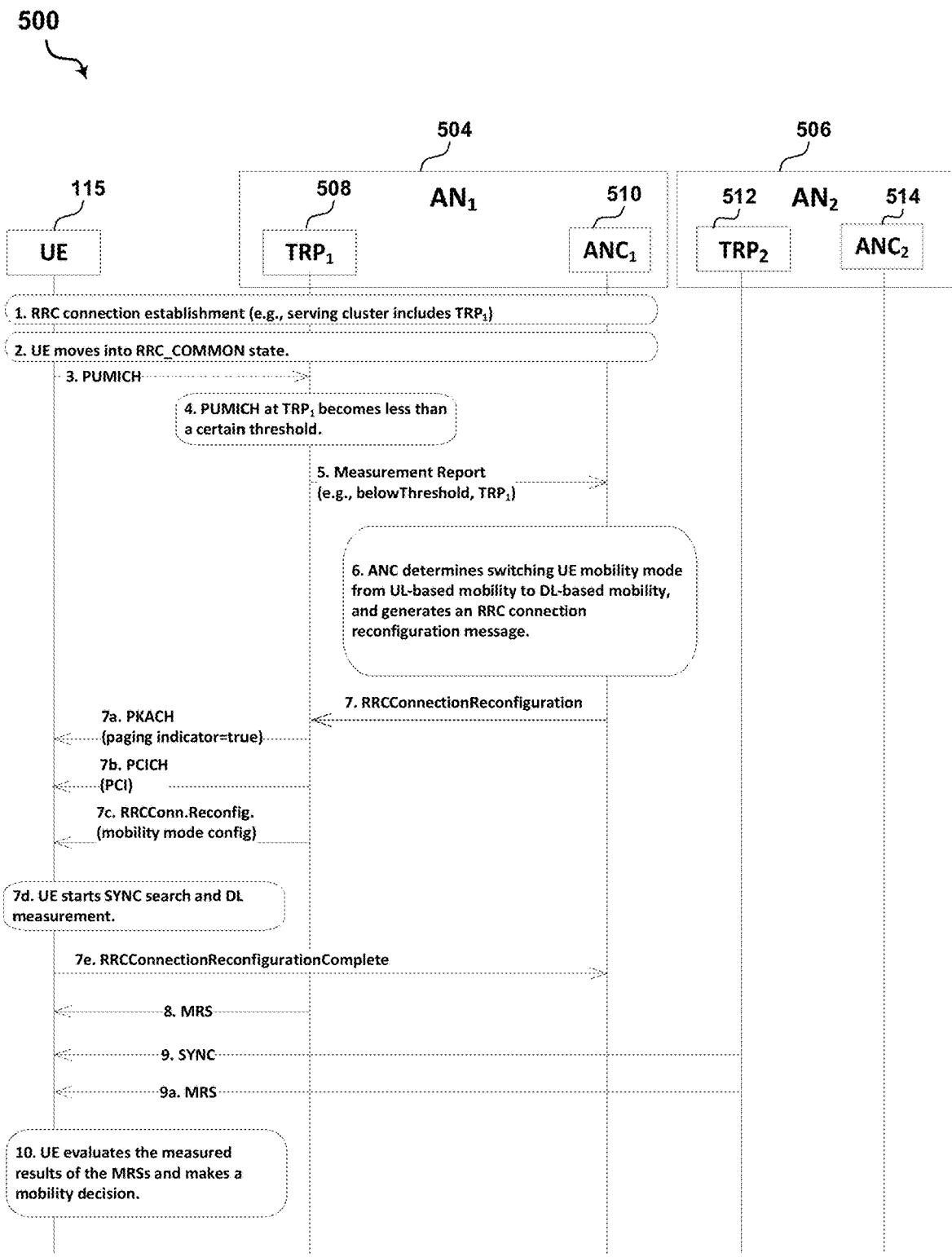
FIG. 5 is a call flow illustrating an example of a network initial uplink mobility mode to downlink mobility mode reconfiguration, according to one or more of the presently described aspects.

FIG. 5 illustrates a call flow 500 of a network initiates UL mobility mode to DL mobility mode reconfiguration in accordance with various aspects of the present disclosure. The call flow may include a UE (e.g., the UE 115 in FIGS. 1-4) in communication with a first access node 504 (or AN$_1$). The first access node 504 may further include a first TRP 508 and a first access node controller 510. In some examples, the wireless communications systems (e.g., the wireless communications system 100 in FIG. 1) may also include a second access node 506 (or AN$_2$) having a second TRP 512 and a second access node controller 514 associated with the second access node 506. In some examples, for the UE 115, the transceiver 470, one or more of the processors 405, the memory 402, the modem 420, the mobility management component 440, and/or its sub-components may be configured to perform one or more aspects of the call flow 500.

The UE 115, at block 1 in FIG. 5, may establish an RRC connection with the first access node 504. In an aspect, a serving cluster may include the first TRP 508. At block 2, the UE 115 may move into RRC_COMMON state, e.g., with the first access node 504. In some aspects, the UE 115 may operate in accordance with UL mobility mode at the initiate state. At block 3, the UE 115 may transmit a PUMICH to the first access node 504. In some examples, the PUMICH may include the same UE-ID as the UE-ID used in the source zone, a new UE-ID which may be assigned by the target zone and sent over an interface by the source zone to the target zone, or an initial access UE-ID which may be used when the UE 115 accesses a zone for the first time. In some aspects, the initial access UE-ID may be either randomly generated or signaled by system information or hard-coded in a specification. The network may monitor the PUMICH and reference signals from the UE 115 to determine the signal quality between the first access node 504 and the UE 115.

At block 4 in FIG. 5, the first TRP 508 may determine whether the PUMICH becomes less than a threshold. When the first TRP 508 determines that the PUMICH has become less than a threshold at block 4, the first TRP 508 may, at block 5, transmit a measurement report to the first access node controller 510. At block 6, the first access node controller 510 may determine whether to switch the UE mobility mode from a UL mobility mode to a DL mobility mode based on the measurement report indicating that the signal quality between the first access node 504 and the UE 115 has fallen below a threshold. Accordingly, the first access node controller 510 may generate an RRC connection reconfiguration message for transmission to the first TRP 508 at block 7. In an example, the RRC connection reconfiguration message may include a UE mobility mode configuration (e.g., UE mobility mode configuration=DL measurement based mobility). In an aspect, the RRC connection reconfiguration message may instruct the first TRP 508 (and the UE 115) to switch from UL mobility mode to DL mobility mode. In some aspects, the instruction(s) to switch is/are forwarded to the UE 115 by the first TRP 508 in a PKACH at block 7*a* (e.g., paging indicator=true). At block 7*b*, the UE 115 may begin monitoring the PCICH (e.g., the UE 115 may monitor and receive a Physical Cell ID (PCI) over the PCICH). At block 7*c*, the UE 115 may receive the RRC connection reconfiguration message (e.g., mobility mode configuration) from the first TRP 508. In some examples, the RRC connection reconfiguration message in the illustrated example may also include a neighbor list for the UE 115. The neighbor list may include one or more of: a neighbor zone list, neighbor cell list, neighbor RAT information, or neighbor frequency information associated with the UE 115. The UE 115 may utilize the neighbor list to reduce the processing requirements of blind zone search steps to execute by only considering SYNC signals from a subset of the target zones or cells. Accordingly, at block 7*d*, the UE 115 may start a SYNC search and DL measurements, and may switch the operating or mobility mode from UL mobility mode to DL mobility mode. At block 7*e*, the UE 115 may transmit an RRC connection confirmation message (e.g., RRCConnectionReconfigurationComplete) to the first access node 504 (e.g., the first access node controller 510) informing the network that the UE 115 has switched the operating or mobility mode from UL mobility mode to DL mobility mode.

Thereafter, in an aspect at block 8 in FIG. 5, for example, the UE 115 may receive a measurement reference signal (MRS) from a serving zone or cell (e.g., the first access node 504 or the first TRP 508). At block 9, the UE 115 may also receive a SYNC signal from the second access node 506 (e.g., target zone or cell) or the second TRP 512. The SYNC signal may include a cell-specific ID (e.g., a cell ID) and/or zone-specific ID (e.g. a zone ID) that identifies the source of the SYNC signal. In some examples, the UE 115 may determine whether the target zone or cell (e.g., second access node 506) is included in the neighbor list. If the zone ID or cell ID of the second access node 506 matches the zone ID or cell ID identified in the neighbor list, the UE 115 may further decode the MRS received from the target zone/cell at block 9*a*. However, if the zone ID or cell ID of the second access node 506 does not match the zone ID or cell ID identified in the neighbor list, the UE 115 may ignore the subsequent MRS from the second access node 506.

In an aspect, at block 10 in FIG. 5, the UE 115 may evaluate the measured results (e.g., the measured results of one or more MRSs), and may make a mobility decision. In some examples, if the zone ID or cell ID of the SYNC signal (e.g., received at block 9) is included in the neighbor list, the UE 115 may compare the MRS(s) of the serving zone/cell and the MRS of the target zone/cell to determine whether to transition to the target zone or cell based on the comparison. In some aspects, in addition to the target zone or cell, the UE 115 may transition from a serving RAT to a target RAT, or from a serving frequency to a target frequency based on the MRS(s) of the first access node 504 and/or the second access node 506. In an aspect, the UE 115 may evaluate different type of MRS(s) (e.g., cell-specific MRS (MRS-C) or zone-specific MRS (MRS-Z)) for mobility decision (e.g., based on the detected SYNC type). For example, if the detected SYNC indicates a none-zone deployment (e.g., for deployment with asynchronous cells), the UE 115 may compare the serving TRP's MRS-C and the neighbor TRPs' MRS-C. If the detected SYNC indicates a zone deployment, the UE 115 may compare the MRS-Zs of serving and neighbor zones. In some examples, the UE 115 may evaluate the measured results, and may make a decision whether to switch or transition the mobility mode (e.g., from UL mobility mode to DL mobility mode, or from DL mobility mode to UL mobility mode). In some implementations, for example, UL-based mobility is deployed in a zone (e.g., with synchronous cells), and a none-zone deployment may use DL-based mobility only.

Figure 6:
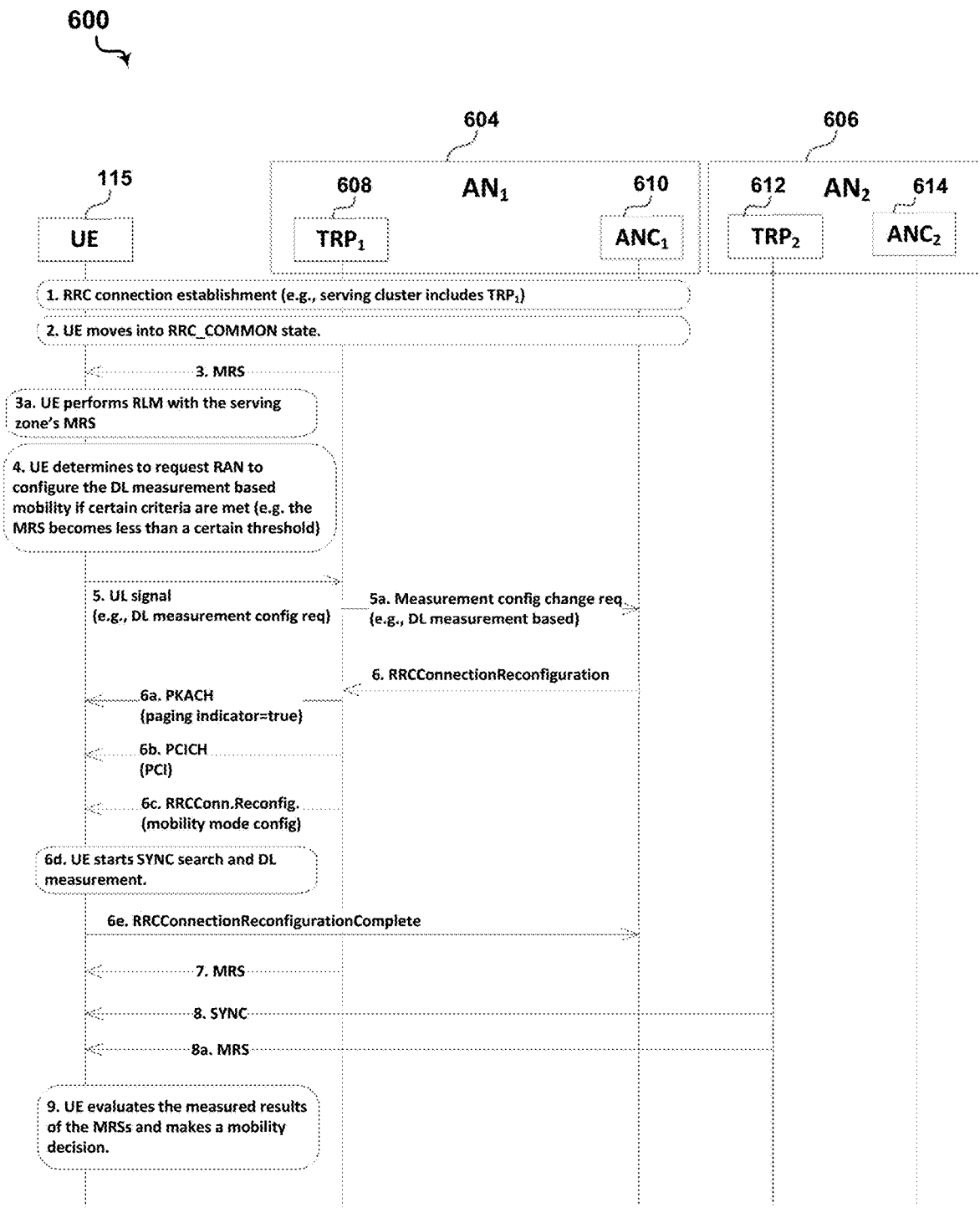
FIG. 6 is a call flow illustrating an example of a UE requested uplink mobility mode to downlink mobility mode switch reconfiguration, according to one or more of the presently described aspects.

FIG. 6 illustrates a call flow 600 of a UE requested UL mobility mode to DL mobility mode switch reconfiguration in accordance with aspects of the present disclosure. The call flow 600 illustrates a UE (e.g., the UE 115 in FIGS. 1-4) in communication with a first access node 604. The first access node 604 may further include a first TRP 608 and a first access node controller 610. In some examples, the wireless communications systems (e.g., the wireless communications system 100 in FIG. 1) may also include a second access node 606 having a second TRP 612 and a second access node controller 614 associated with the second access node 606. In some examples, for the UE 115, the transceiver 470, one or more of the processors 405, the memory 402, the modem 420, the mobility management component 440, and/or its sub-components may be configured to perform one or more aspects of the call flow 600.

Similar to FIG. 5, the UE 115 at block 1 in FIG. 6 may establish an RRC connection with the first access node 604. In an aspect, a serving cluster may include the first TRP 608. At block 2, the UE 115 may move into RRC_COMMON state, e.g., with the first access node 604. In some aspects, the UE 115 may operate in accordance with UL mobility mode at the initiate state. In the illustrated example, although the UE 115 is initially operating in a UL mobility mode, the UE 115 may not necessarily wait on the network to initiate the UE's transition from UL mobility mode to DL mobility mode when the signal quality between the UE 115 and the first access node 604 falls below a threshold (e.g., in contrast to the call flow 500 shown in FIG. 5). Instead, as shown in block 3 in FIG. 6, the UE 115, while in UL mobility mode, may still receive MRS(s) from the serving zone or cell (e.g., first access node 604). At block 3a, the UE 115 may determine whether signal quality is falling below a threshold based on the received MRS. If the signal quality is less than a threshold, the UE 115, at block 4 in FIG. 6, may request the network to initiate an RRC connection reconfiguration to allow the UE 115 to switch from UL mobility mode to DL mobility mode. At block 5, the UE 115 may send or transmit one or more UL signals, for example, a UL signal measurement report, and/or a request for DL measurement configuration or reconfiguration. Once the first TRP 608 receives the UL signal measurement report (e.g., with a request for DL measurement configuration or reconfiguration) from the UE 115, at block 5a, the first TRP 608 may send or forward a request for measurement configuration change or reconfiguration (e.g., a DL measurement based request) to the first access node controller 610. In some aspects, block 6 to block 9 of the call flow 600 in FIG. 6 may follow block 7 to block 10 of the call flow 500 in FIG. 5. In other words, the network (e.g., the first access node 604 and/or the second access node 606) may initiate one or more steps at block 6 to block 9 in FIG. 6 similar to those identified in FIG. 5 (e.g., at block 7 to block 10 of the call flow 500).

Figure 7:
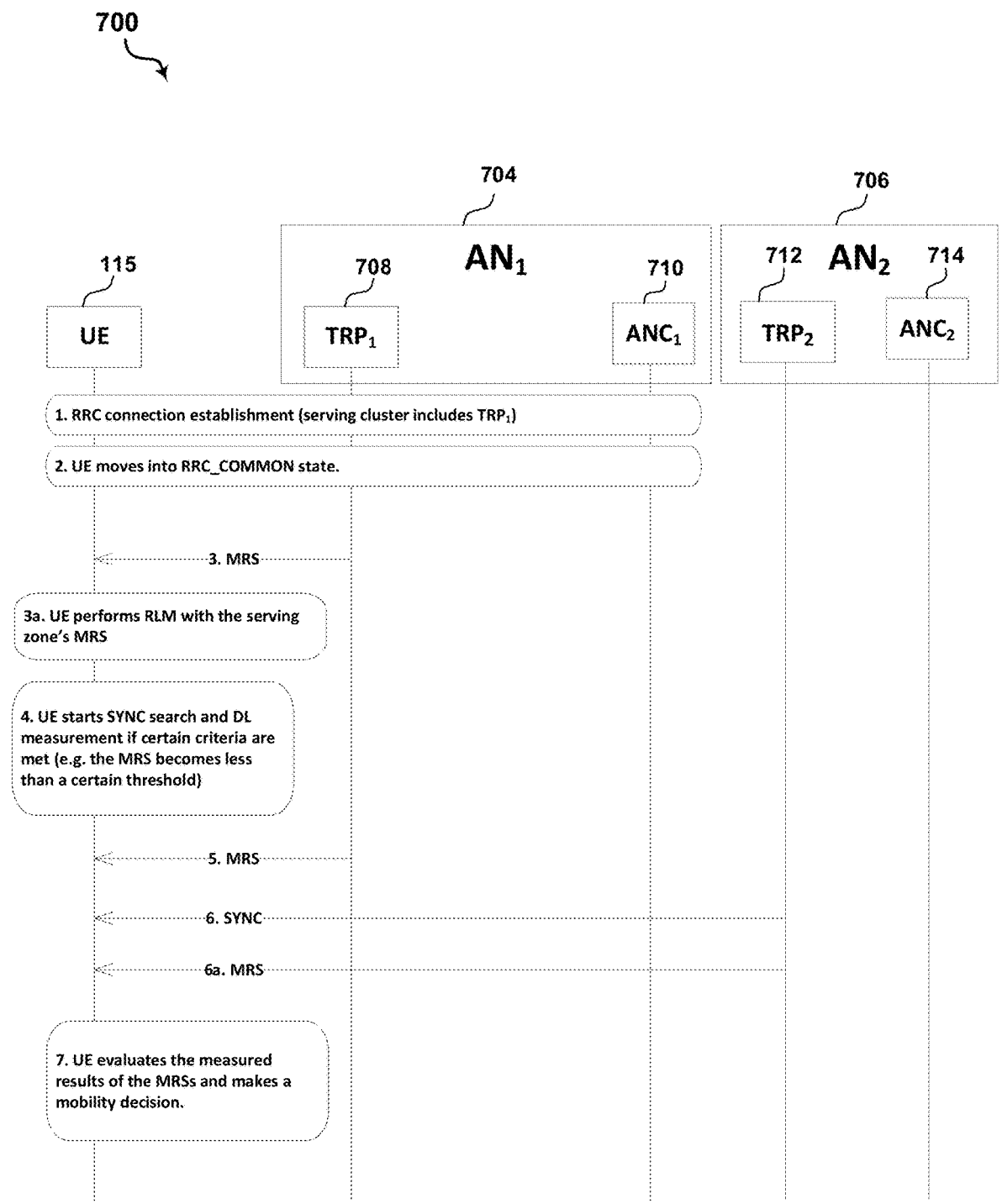
FIG. 7 is a call flow illustrating an example of an autonomous switch from uplink mobility mode to downlink mobility mode, according to one or more of the presently described aspects.

FIG. 7 illustrates a call flow 700 for an autonomous switch from UL mobility mode to DL mobility mode in accordance with various aspects of the present disclosure. The call flow 700 illustrates a UE (e.g., the UE 115) in communication with a first access node 704. The first access node 704 may further include a first TRP 708 and a first access node controller 710. In some examples, the wireless communications systems (e.g., the wireless communications system 100 in FIG. 1) may also include a second access node 706 having a second TRP 712 and a second access node controller 714 associated with the second access node 706. In some examples, for the UE 115, the transceiver 470, one or more of the processors 405, the memory 402, the modem 420, the mobility management component 440, and/or its sub-components may be configured to perform one or more aspects of the call flow 700.

Similar to FIG. 6, the UE 115 at block 1 in FIG. 7 may establish an RRC connection with the first access node 704. In an aspect, a serving cluster may include the first TRP 708. At block 2, the UE 115 may move into RRC_COMMON state, e.g., with the first access node 704. In some aspects, the UE 115 may operate in accordance with UL mobility mode at the initiate state. At block 3, the UE 115, while in UL mobility mode, may receive one or more MRSs from the serving zone or cell (e.g., first access node 704). At block 3a, the UE 115 may determine whether the signal quality is falling below a threshold based on the received one or more MRSs.

In the illustrated example, and in contrast to FIG. 6, the UE 115 may not request the network for RRC connection (re)configuration to switch from UL mobility mode to DL mobility mode when the signal quality between the first access node 704 and the UE 115 falls below a threshold based on the MRS from the first access node 704. Instead, as shown in block 4 in FIG. 7, the UE 115 may start a SYNC search and/or perform DL measurement if certain criteria are met. In an example, after determining that the signal quality is above a certain threshold, the UE 115 may be still in the current mobility mode and/or with the current serving zone. In another example, after determining that the signal quality has fallen below a certain threshold, the UE 115 may unilaterally start SYNC search and DL measurement (e.g., by switching UE operating or mobility mode from UL mobility mode to DL mobility mode) without waiting for RRC connection (re)configuration message from the network. In such condition (e.g., the signal quality has fallen below a certain threshold), for example, the UE 115 may instead request the network (e.g., serving zone or cell) to transmit the neighbor list to the UE 115 such that the UE 115 may minimize the blind zone search procedures to a subset of zones, cells, RATs, or frequencies.

In some aspects, block 5 to block 7 of the call flow 700 in FIG. 7 may follow block 7 to block 9 of the call flow 600 in FIG. 6. In other words, the network (e.g., the first access node 704 and/or the second access node 706) may initiate one or more steps at block 5 to block 7 in FIG. 7 similar to those identified in FIG. 6 (e.g., at block 7 to block 9 of the call flow 600).

Figure 8:
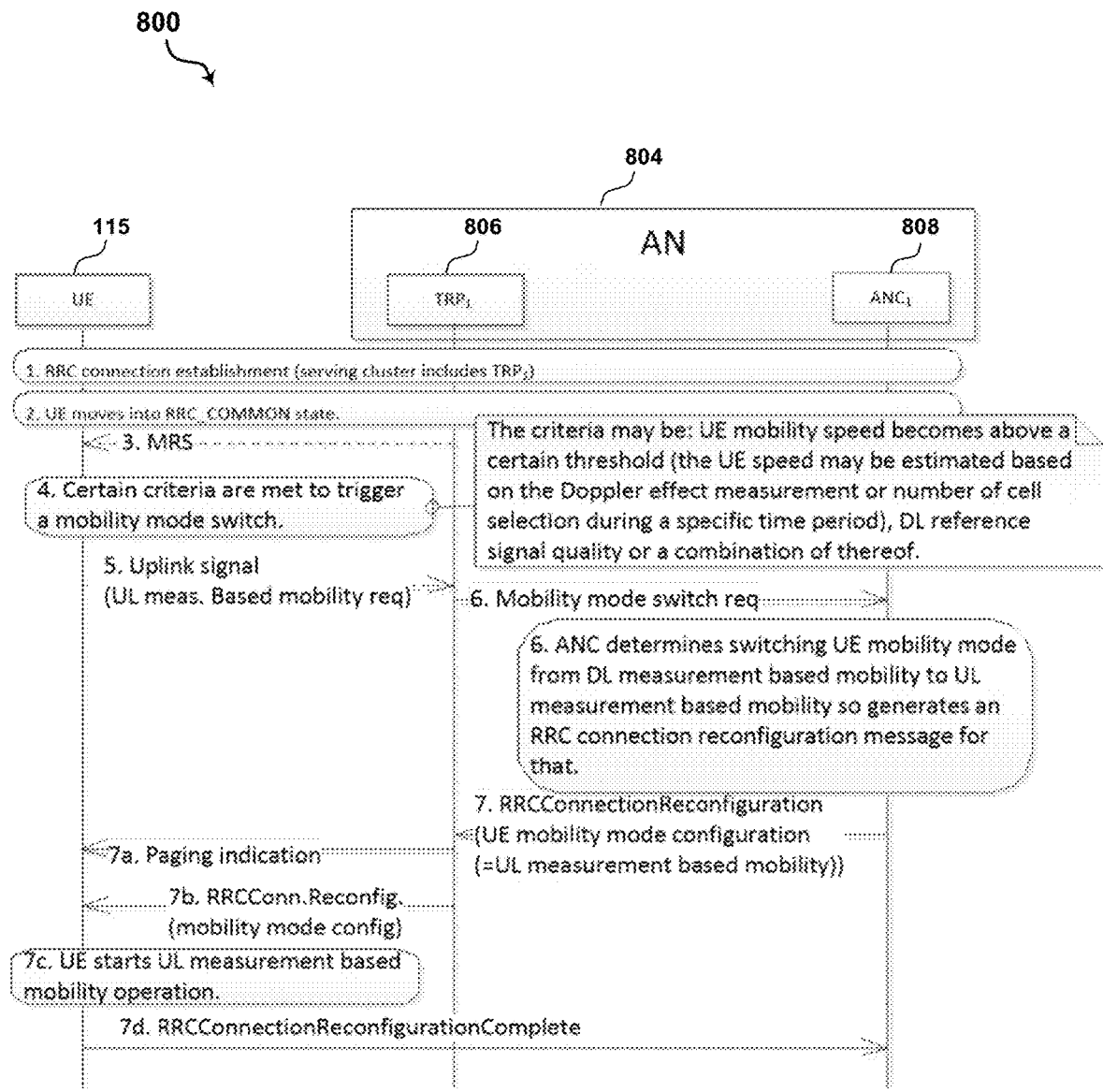
FIG. 8 is a call flow illustrating an example of a UE requested downlink mobility mode to uplink mobility mode reconfiguration, according to one or more of the presently described aspects.

FIG. 8 illustrates a call flow 800 for a UE requested DL mobility mode to UL mobility mode reconfiguration in accordance with various aspects of the present disclosure. The call flow 800 illustrates a UE (e.g., the UE 115) in communication with an access node 804. The access node 804 may further include a TRP 806 and an access node controller 808. As with the transition from UL mobility mode to DL mobility mode, call flow 800 shows an example where the UE may request transition from DL mobility mode to UL mobility mode from the network when one or more conditions are satisfied. In some examples, for the UE 115, the transceiver 470, one or more of the processors 405, the memory 402, the modem 420, the mobility management component 440, and/or its sub-components may be configured to perform one or more aspects of the call flow 800.

In FIG. 8, the UE 115 at block 1 may establish an RRC connection with the access node 804. In an aspect, a serving cluster may include the TRP 806. At block 2, the UE 115 may move into RRC_COMMON state, e.g., with the access node 804. In some aspects, the UE 115 may operate in accordance with DL mobility mode at the initiate state. At block 3, the UE 115, while in DL mobility mode, may receive one or more MRSs from the serving zone or cell (e.g., the access node 804).

At block 4 in FIG. 8, certain criteria may be met to trigger a mobility mode switch. In an example, when the UE 115 (e.g., operating in DL mobility mode) determines that the UE mobility speed is above a certain threshold, the UE 115 may request a mobility mode switch to a UL mobility mode which may be better suited for high mobility UEs. In some examples, the UE speed may be estimated based on the Doppler effect measurements or number of cell selections during a specific time period. In some examples, the criteria to trigger a mobility mode switch may include UE mobility speed being above a certain threshold, or DL reference signal quality, or a combination of thereof.

At block 5, the UE 115 may send or transmit one or more UL signals, for example, a request for a particular mobility mode (e.g., a UL measurement based mobility request) to the TRP 806. Once the TRP 806 receives the one or more UL signals (e.g., with a request for UL measurement based mobility) from the UE 115, at block 6, the TRP 806 may send a request for mobility mode switch (e.g., a request to switch to a UL-based mobility mode) to the access node controller 808. In an aspect, at block 6, the access node controller 808 may determine whether to switch the UE mobility mode from a DL mobility mode to a UL mobility mode based on the information provided at block 4 and/or block 5.

Accordingly, based on the request (e.g., the request sent from the UE 115 and forwarded by the TRP 806) for transition to the UL mobility mode, the access node 804 (e.g., by the access node controller 808) may make a determination (e.g., whether to switch or transition the mobility mode) at block 6, and may generate an RRC connection reconfiguration message for the TRP 806 and the UE 115 to initiate the mobility mode switch. In an example, the access node controller 808 may generate an RRC connection reconfiguration message for transmission to the TRP 806 at block 7. In an example, the RRC connection reconfiguration message may include a UE mobility mode configuration (e.g., UE mobility mode configuration=UL measurement based mobility or UL-based mobility). In an aspect, the RRC connection reconfiguration message may instruct the TRP 806 (and the UE 115) to switch from DL mobility mode to UL mobility mode. In some aspects, the instruction(s) to switch is/are forwarded to the UE 115 by the TRP 806 in a message (e.g., a paging indication, or a paging message) at block 7a. At block 7b, the UE 115 may receive the RRC connection reconfiguration message (e.g., mobility mode configuration) from the TRP 806. In some examples, the RRC connection reconfiguration message in the illustrated example may also include a neighbor list for the UE 115 as discussed herein. Accordingly, at block 7c, the UE 115 may switch the operating or mobility mode from DL mobility mode to UL mobility mode, and start UL measurement based mobility operation(s). At block 7d, the UE 115 may transmit an RRC connection confirmation message (e.g., an RRCConnectionReconfigurationComplete message) to the access node 804 (e.g., to the access node controller 808) informing the network that the UE 115 has switched the operating or mobility mode from DL mobility mode to UL mobility mode.

Figure 9:
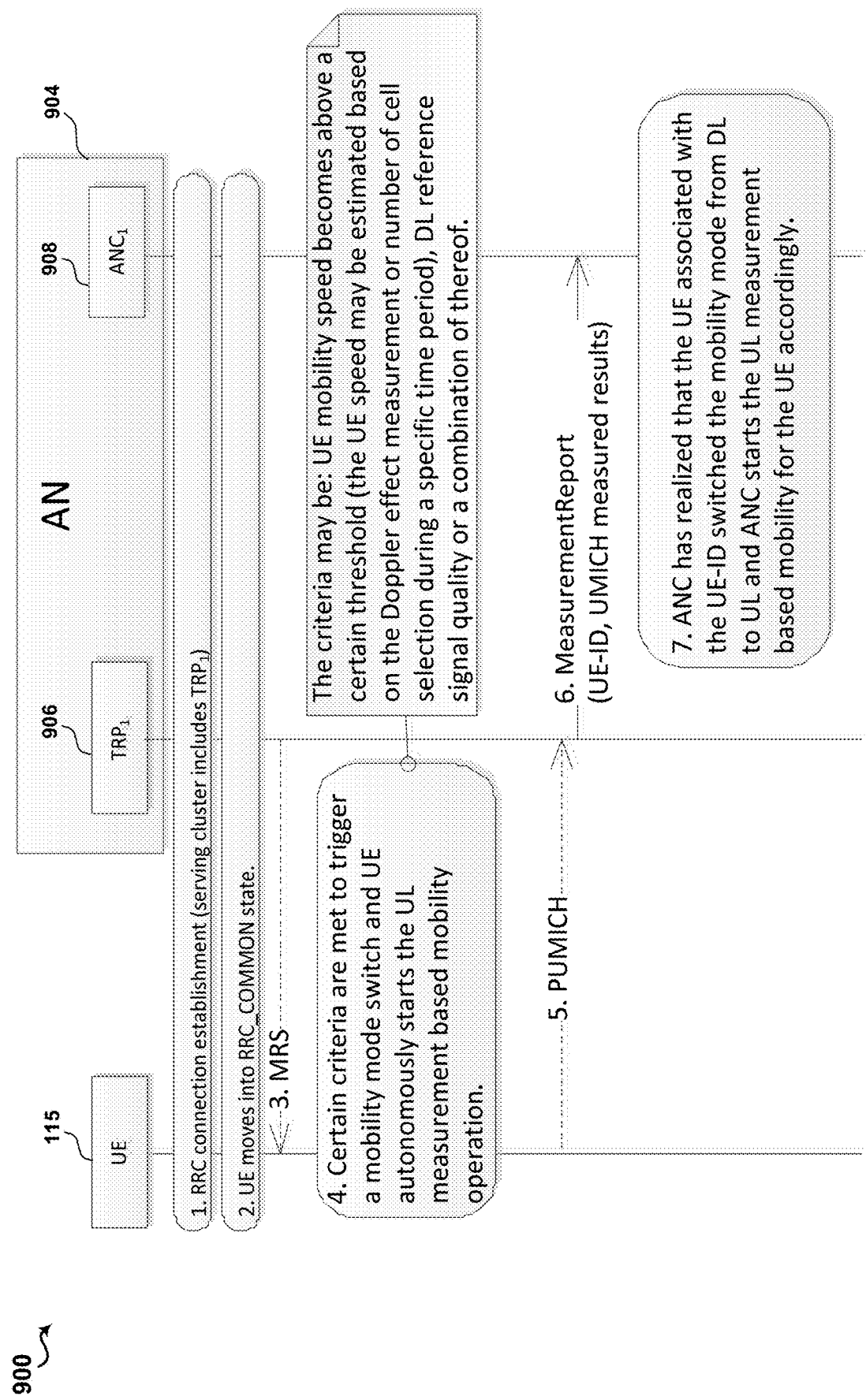
FIG. 9 is a call flow illustrating an example of an autonomous downlink mobility mode to uplink mobility mode switch, according to one or more of the presently described aspects.

FIG. 9 illustrates a call flow 900 for an autonomous DL mobility mode to UL mobility mode switch in accordance with various aspects of the present disclosure. The call flow 900 illustrates a UE (e.g., the UE 115) in communication with an access node 904. The access node 904 may include a TRP 906 and an access node controller 908. In some examples, for the UE 115, the transceiver 470, one or more of the processors 405, the memory 402, the modem 420, the mobility management component 440, and/or its sub-components may be configured to perform one or more aspects of the call flow 900.

In the illustrated example, the UE 115 may autonomously switch the mobility modes (e.g., from DL mobility mode to UL mobility mode) without requesting an RRC connection reconfiguration message from the access node when one or more conditions are satisfied. In some aspects, block 1 to block 3 of the call flow 900 in FIG. 9 may follow block 1 to block 3 of the call flow 800 in FIG. 8. At block 4 in FIG. 9, the UE 115 may determine whether certain criteria are met to trigger a mobility mode switch. In some examples, the UE speed may be estimated based on the Doppler effect measurements or number of cell selections during a specific time period. In some examples, the criteria to trigger a mobility mode switch may include UE mobility speed being above a certain threshold, or certain DL reference signal quality, or a combination of thereof. In an aspect, the UE 115 may autonomously start the UL-based mobility operation. In an example, when the UE 115 determines that the UE mobility speed exceeds a predetermined threshold, the UE 115 may unilaterally switch its operating mode from DL mobility mode to UL mobility mode as the UL mobility mode may be better suited to handle high mobility UEs.

At block 5 in FIG. 9, the UE 115 may transmit a PUMICH to the access node 904 (e.g., the TRP 906). In some examples, the PUMICH may include the same UE-ID as the UE-ID used in the source zone, a new UE-ID which may be assigned by the target zone and sent over an interface by the source zone to the target zone, or an initial access UE-ID which may be used when the UE 115 accesses a zone for the first time. In some aspects, the initial access UE-ID may be either randomly generated or signaled by system information or hard-coded in a specification. The network may monitor the PUMICH and reference signals from the UE 115 to determine the signal quality between the access node 904 and the UE 115. At block 6, the TRP 906 may transmit a measurement report to the access node controller 908. In some examples, the measurement report may include a UE-ID, and/or UMICH measurement results. Based on the received measurement report at block 6, the access node controller 908, at block 7, may realize that the UE 115 which associated with the UE-ID (e.g., the UE-ID received in the measurement report) has switched the mobility mode from DL-based mobility to UL-based mobility, and accordingly, the access node controller 908 may start the UL-based mobility operation with the UE 115.

Figure 10:
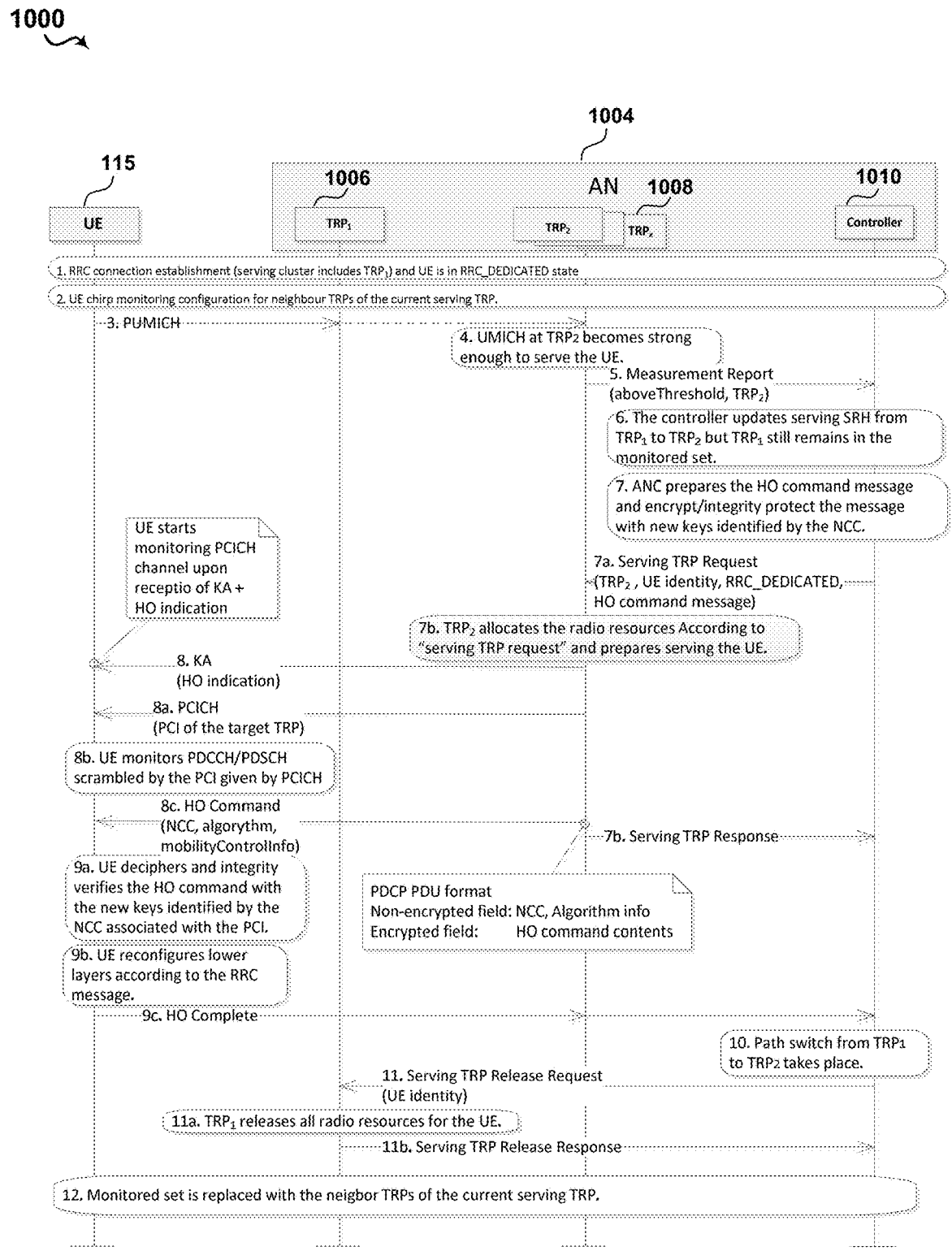
FIG. 10 is a call flow illustrating an example of an uplink measurement based intra-zone forward handover, according to one or more of the presently described aspects.

FIG. 10 illustrates a call flow 1000 for a UL measurement based intra-zone forward handover in accordance with various aspects of the present disclosure. The call flow 1000 illustrates a UE (e.g., the UE 115) in communication with an access node 1004. The access node 1004 may further include a plurality of TRPs (e.g., a first TRP 1006, one or more TRPs 1008 ($TRP_2 \ldots TRP_n$) and a node controller 1010. In some examples, for the UE 115, the transceiver 470, one or more of the processors 405, the memory 402, the modem 420, the mobility management component 440, and/or its sub-components may be configured to perform one or more aspects of the call flow 1000.

At block 1 in FIG. 10, the UE 115 may establish RRC connection with the access node 1004. In an aspect, a serving cluster may include the first TRP 1006, and the UE 115 may be in a RRE DEDICATED state. At block 2, the UE 115 may monitor configurations for neighbor TRPs (e.g., the neighbor TRPs of the current serving TRP). At block 3, the UE 115 may transmit a PUMICH to the first TRP 1006 (e.g., $TRP_1$) that may be forwarded to the plurality of neighbor TRPs. At block 4, when the UMICH at a second TRP 1008 (e.g., $TRP_2$) is greater than a threshold (e.g., strong enough to serve the UE 115), the second TRP 1008 may transmit, at block 5, a measurement report to the controller 1010 of the access node 1004.

In some examples, the controller 1010, at block 6 in FIG. 10, may update the serving zone from the first TRP 1006 to the second TRP 1008 based on the received measurement report. In such case, the first TRP 1006 may still remain in the monitored set. At block 7, the controller 1010 may prepare a handover command message and encrypt/integrity protect the message with new keys identified by a next-hop chaining counter (NCC). In an aspect, an NCC is used to inform (or indicate) the UE 115 whether a new key should be derived via a vertical key derivation (e.g., an eNB key ($K_{eNB}$) is derived from a core network (CN) key (e.g., $K_{ASME}$)) or should be derived via a horizontal key derivation (e.g., a $K_{eNB}$ is derived from the previously used $K_{eNB}$). In some examples, the UE 115 may perform the vertical key derivation if the received NCC value is different from the one stored in the UE 115, otherwise the UE 115 performs the horizontal key derivation. In some aspects, the keys discussed herein may be one or more security keys used in Evolved Packet Core (EPC), Evolved Universal Terrestrial Access Network (E-UTRAN), and/or defined by 3GPP. For example, $K_{eNB}$ is a key used in an Access Stratum (AS) (e.g., at the UE 115 and/or E-UTRAN) to derive an integrity protection key and encryption keys for C-plane and/or U-plane, and $K_{ASME}$ is used in CN to derive the $K_{eNB}$ for the AS.

At block 7a, the controller 1010 may transmit a serving TRP request message to, for example, the second TRP 1008, that includes the handover command message. In some examples, the serving TRP request message may include information related to the TRP destination, UE identity, a RRC state (e.g., RRC_DEDICATED, and/or a handover (HO) command message. In response, at block 7b, the second TRP 1008 may allocate the radio resource according to the serving TRP request. The allocated radio resource identification information (e.g., Keep-Alive (KA) information, handover (HO) indication) may be transmitted to the UE 115 thereafter at block 8. In some examples, the UE 115, block 8, begins monitoring the PCICH channel upon reception of the KA information and/or the HO indication. In some examples, KA information may be some information with one or more bits which carries ACK for PUMICH or a paging indication. For example, the paging indication may indicates that there is (or will be) one or more paging messages for the UE 115. In an implementation, the KA information may be carried in a PKACH.

At block 9a in FIG. 10, the UE 115 may decipher and integrity verify the handover command received from the second TRP 1008 based on an updated keys identified by the NCC associated with the PCI. At block 9b, the UE 115 may reconfigure the lower layers according to the RRC message, and at block 9c, the UE 115 may transmit a handover complete message (e.g., HO Complete) to the second TRP 1008, and the handover complete message may be forwarded to the controller 1010. At block 10, the controller 1010 may switch paths for the UE 115 from the first TRP 1006 (e.g., $TRP_1$) to the second TRP 1008 (e.g., $TRP_2$) upon receiving handover complete message. At block 11, the controller 1010 may send a serving TRP release request message (e.g., with a UE identity or a UE-ID) to the first TRP 1006. Upon reception of the serving TRP release request, at block 11a, the first TRP 1006 may release all radio resources for the UE 115 (e.g., based on the received UE identity or UE-ID). At block 11b, the first TRP 1006 may send a serving TRP release response message to the controller 1010. Accordingly, at block 12, the monitored set may be replaced with the neighbor TRPs of the current serving TRP.

Figure 11:
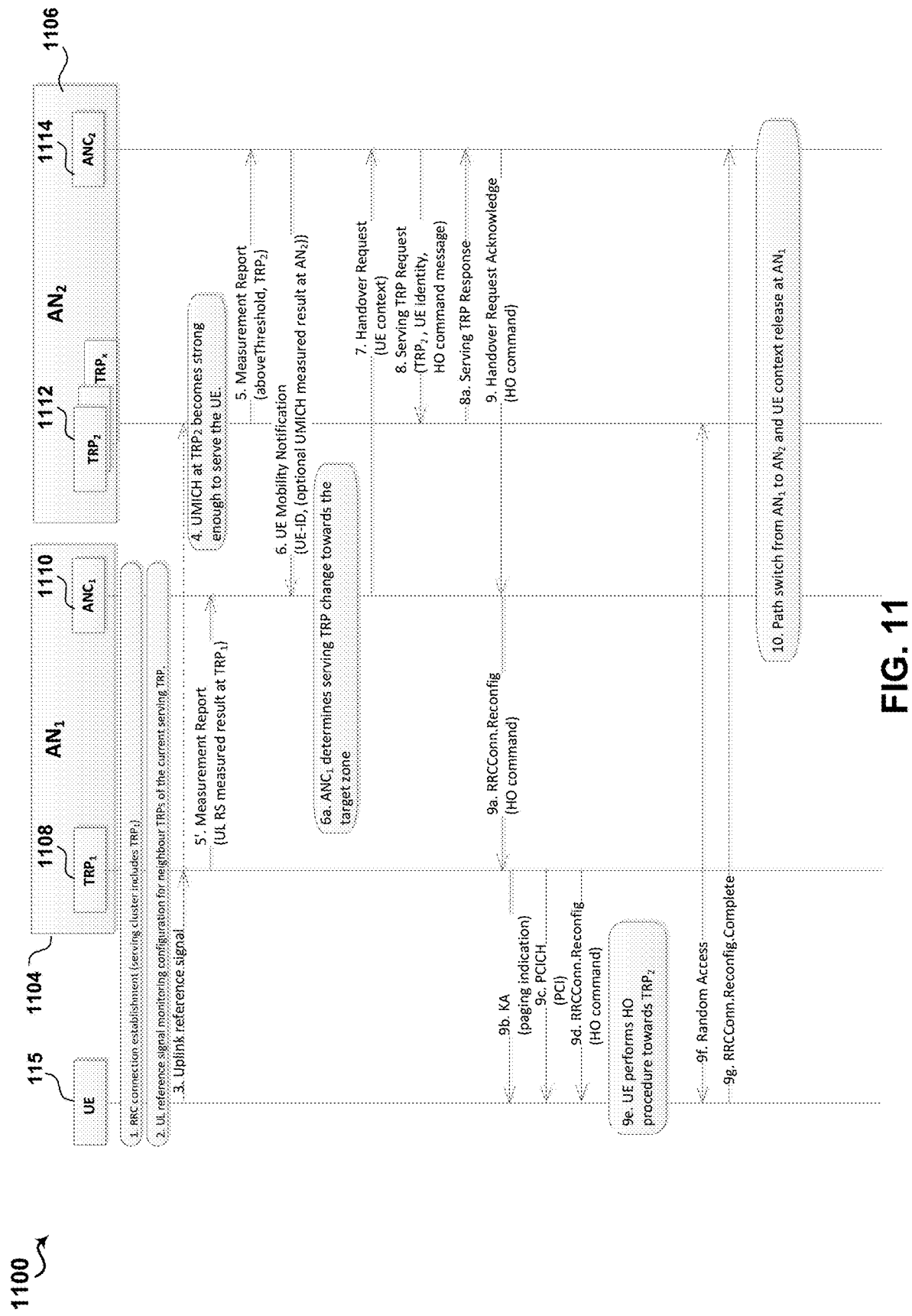
FIG. 11 is a call flow illustrating an example of an uplink measurement based inter-zone backward handover, according to one or more of the presently described aspects.

FIG. 11 illustrates a call flow 1100 for a UL measurement based inter-zone backward handover in accordance with various aspects of the present disclosure. The call flow 1100 illustrates a UE (e.g., the UE 115) in communication with a first access node 1104. The first access node 1104 may further include a first TRP 1108 and a first access node controller 1110. In some examples, the wireless communications systems (e.g., the wireless communications system 100 in FIG. 1) may also include a second access node 1106 having a plurality of TRPs 1112 (e.g., $TRP_2, \ldots TRP_x$, etc.) and a second access node controller 1114 associated with the second access node 1106. In some examples, for the UE 115, the transceiver 470, one or more of the processors 405, the memory 402, the modem 420, the mobility management component 440, and/or its sub-components may be configured to perform one or more aspects of the call flow 1100.

In contrast to FIG. 10 that illustrates an intra-zone handover, call flow 1100 shows the steps for initiating a TRP change towards the target zone from a first access node 1104 to the second access node 1106 based on uplink measurements. At block 1 in FIG. 11, the UE 115 may establish RRC connection with the first access node 1104. In an aspect, a serving cluster may include the first TRP 1108. At block 2, the UE 115 may monitor configurations for neighbor TRPs (e.g., the neighbor TRPs of the current serving TRP). At block 3, the UE 115 may transmit one or more uplink reference signals to the first TRP 1108 (e.g., $TRP_1$) that may be forwarded to the plurality of neighbor TRPs (with the second access node 1106). At block 4, for example, when the UMICH at the second TRP 1112 (e.g., $TRP_2$) is greater than a threshold (e.g., strong enough to serve the UE 115), the second TRP 1112 may transmit, at block 5, a measurement report to the second access node controller 1114 of the second access node 1106. On the other hand, at block 5', the first TRP 1108 of the first access node 1104 may prepare a measurement report of the signal quality based on the one or more uplink reference signals transmitted by the UE 115 (e.g., UL reference signal measurement results at the first TRP 1108).

At block 6 in FIG. 11, the second access node controller 1114 may send a UE mobility notification to the first access node controller 1110, based on the received measurement report at block 5. In some examples, the UE mobility notification may include the UE-ID, or UMICH measurement results at the second access node 1106. At block 6a, after reception of the UE mobility notification, the first access node controller 1110 may determine a serving TRP change/switch towards the target zone (e.g., the second TRP 1112). In some examples, the determination at block 6a may include determining whether the UMICH at the second TRP 1112 (that is associated with the second access node 1106) exceeds the UMICH at the first TRP 1108 associated with the first access node 1104. At block 7, if the UMICH at the second TRP 1112 exceeds the UMICH at the first TRP 1108, the first access node controller 1110 may transmit a handover request to the second access node controller 1114 (e.g., to switch paths for the UE 115 from the first access node 1104 to the second access node 1106).

At block 8 in FIG. 11, the second access node controller 1114 may send a serving TRP request to the second TRP 1112. In some examples, the serving TRP request may include the target TRP (e.g., the second TRP 1112), the UE identity (e.g., the UE-ID), and/or a handover (HO) command message. At block 8a, the second access node controller 1114 may receive a confirmation via a serving TRP response message from the second TRP 1112. At block 9, the second access node controller 1114 may send a handover request acknowledge (e.g., with an HO command) to the first access node controller 1110. Upon reception of the handover request acknowledge, at block 9a, the first access node controller 1110 may send an RRC connection reconfiguration message (e.g., the HO command) to the first TRP 1108.

At block 9b in FIG. 11, the KA information and/or the paging indication may be transmitted to the UE 115 from the first TRP 1108. In some examples, at block 9c, the UE 115 begins monitoring and receiving the PCICH channel upon reception of the KA information and/or the paging indication. At block 9d, the RRC connection reconfiguration message (e.g., the HO command) may be transmitted from the first TRP 1108 to the UE 115. Accordingly, at block 9e, the UE 115 may perform one or more HO procedures for switching to the second TRP 1112. At block 9f, the UE 115 and the second TRP 1112 may start to perform one or more random access operations. At block 9g, the UE 115 may transmit an RRC connection confirmation message (e.g., an RRCConnectionReconfigurationComplete message) to the second access node controller 1114. At block 10, one or more paths may be switched, for the UE 115, from the first access node 1104 to the second access node 1106 upon receiving the RRC connection confirmation message. In an aspect, at block 10, the first access node 1104 may release all radio resources for the UE 115 (e.g., UE context).

Figure 12:
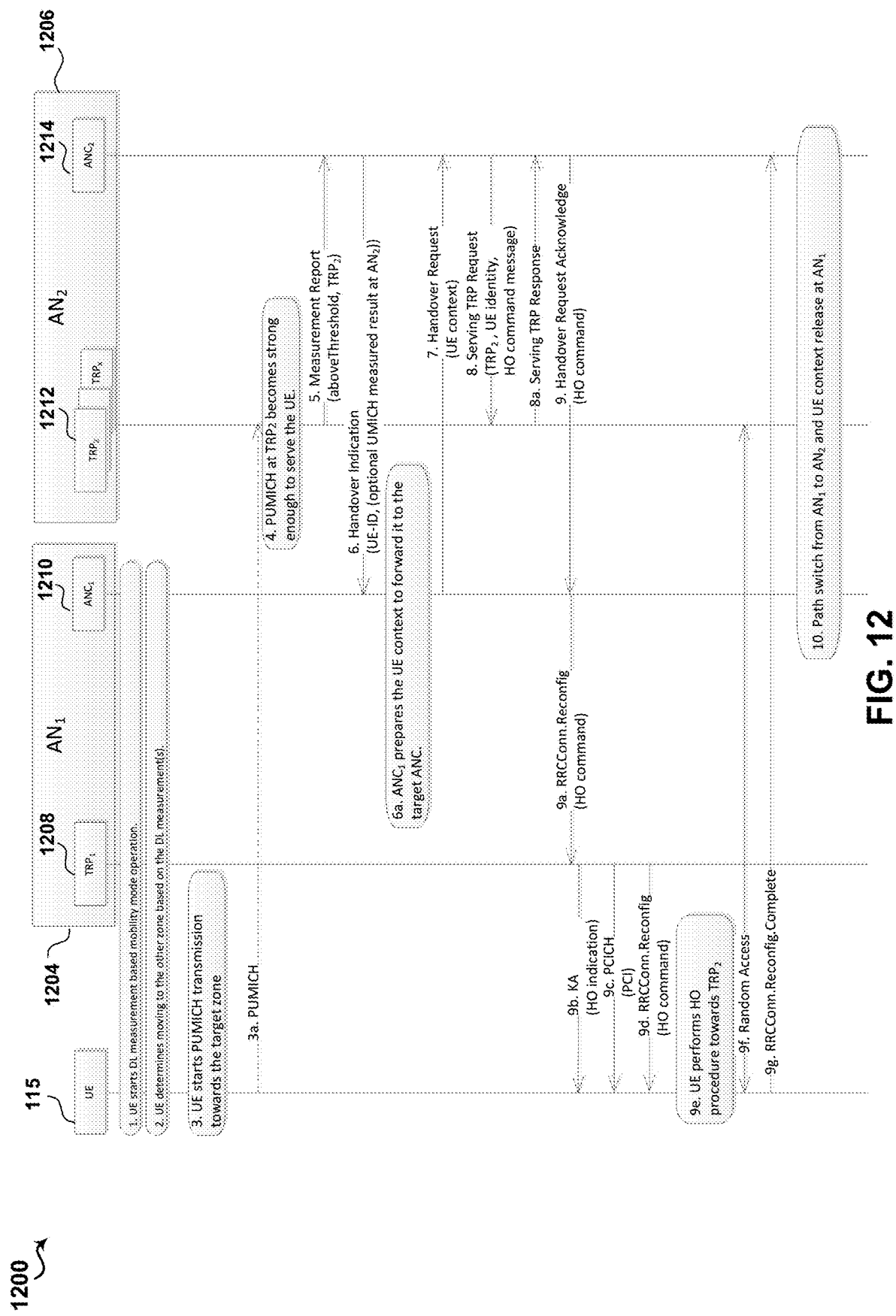
FIG. 12 is a call flow illustrating an example of a downlink measurement based inter-zone mobility for backward handover, according to one or more of the presently described aspects.

FIG. 12 illustrates a call flow 1200 for a DL measurement based inter-zone mobility for backward handover in accordance with various aspects of the present disclosure. The call flow 1200 illustrates a UE (e.g., the UE 115) in communication with a first access node 1204. The first access node 1204 may further include a first TRP 1208 and a first access node controller 1210. In some examples, the wireless communications systems (e.g., the wireless communications system 100 in FIG. 1) may also include a second access node 1206 having a plurality of TRPs 1212 (e.g., TRP$_2$, ... TRP$_x$, etc.) and a second access node controller 1214 associated with the second access node 1206. In some examples, for the UE 115, the transceiver 470, one or more of the processors 405, the memory 402, the modem 420, the mobility management component 440, and/or its sub-components may be configured to perform one or more aspects of the call flow 1200.

In contrast to FIG. 11 that initiates the handover to the second access node 1106 based on measurements from UL mobility mode, call flow 1200 illustrates a method where the UE 115 starts PUMICH transmission towards a target zone upon determining to move from the first access node 1204 to the second access node 1206 based in part on the DL measurement. In an aspect, at block 1 in FIG. 12, the UE 115 may start DL measurements and DL-based mobility mode operation(s). At block 2, the UE 115 may determine to move to another zone (e.g., a target zone) based on the DL measurements. At block 3, the UE 115 starts PUMICH transmissions towards a target zone. In an example, at block 3a, the UE 115 may transmit PUMICH to the target zone, e.g., the second TRP 1212. In some aspects, block 4 to block 10 of the call flow 1200 in FIG. 12 may follow block 4 to block 10 of the call flow 1100 in FIG. 11.

Figure 13:
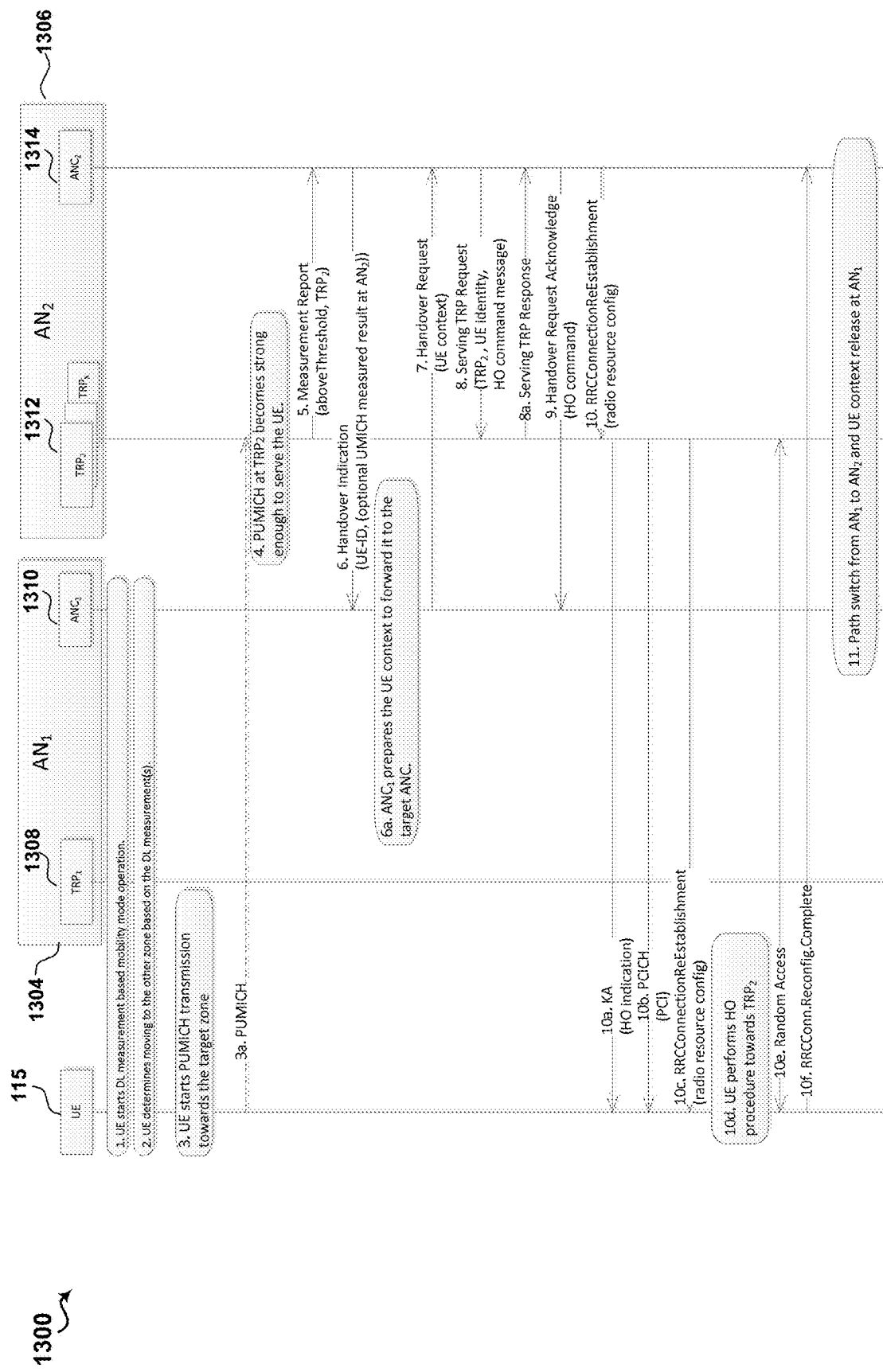
FIG. 13 is a call flow illustrating an example of a downlink measurement based inter-zone mobility, according to one or more of the presently described aspects.

FIG. 13 illustrates a call flow 1300 for a DL measurement based inter-zone mobility in accordance with various aspects of the present disclosure. The call flow 1300 illustrates a UE (e.g., the UE 115) in communication with a first access node 1304. The first access node 1304 may further include a first TRP 1308 and a first access node controller 1310. In some examples, the wireless communications systems (e.g., the wireless communications system 100 in FIG. 1) may also include a second access node 1306 having a plurality of TRPs 1312 (e.g., TRP$_2$, ... TRP$_x$, etc.) and a second access node controller 1314 associated with the second access node 1306. In some examples, for the UE 115, the transceiver 470, one or more of the processors 405, the memory 402, the modem 420, the mobility management component 440, and/or its sub-components may be configured to perform one or more aspects of the call flow 1300.

In contrast to FIG. 12 that illustrated a backward handover for inter-zone mobility, FIG. 13 illustrates an example of a forward handover based on DL measurements in inter-zone mobility. A difference between the downlink based backward and forward handover is that for backward handover (e.g., in FIG. 12), the UE 115 may monitor the source zone's PHY channels. In contrast, for the forward handover (e.g., in FIG. 13), the UE 115 may monitor the target zone's PHY channels to receive the handover command from the RAN.

In some aspects, block 1 to block 9 of the call flow 1300 in FIG. 13 may follow block 1 to block 9 of the call flow 1200 in FIG. 12. At block 10 in FIG. 13, the second access node controller 1314 may send an RRC connection re-establishment message (e.g., a radio resource configuration) to the second TRP 1312. Upon reception of the RRC connection re-establishment message, at block 10a, the KA information and/or the HO indication may be transmitted to the UE 115 from the second TRP 1312. In some examples, at block 10b, the UE 115 begins monitoring and receiving the PCICH channel upon reception of the KA information and/or the HO indication from the second TRP 1312. At block 10c, the RRC connection re-establishment message (e.g., the radio resource configuration) may be transmitted or forwarded from the second TRP 1312 to the UE 115.

Accordingly, at block 10*d*, the UE 115 may perform one or more HO procedures for switching to the second TRP 1312. At block 10*e*, the UE 115 and the second TRP 1312 may start to perform one or more random access operations. At block 10*f*, the UE 115 may transmit an RRC connection confirmation message (e.g., an RRCConnectionReconfiguration-Complete message) to the second access node controller 1314. At block 11, one or more paths may be switched, for the UE 115, from the first access node 1304 to the second access node 1306 upon receiving the RRC connection confirmation message. In an aspect, at block 11, the first access node 1304 may release all radio resources for the UE 115 (e.g., UE context).

Figure 14:
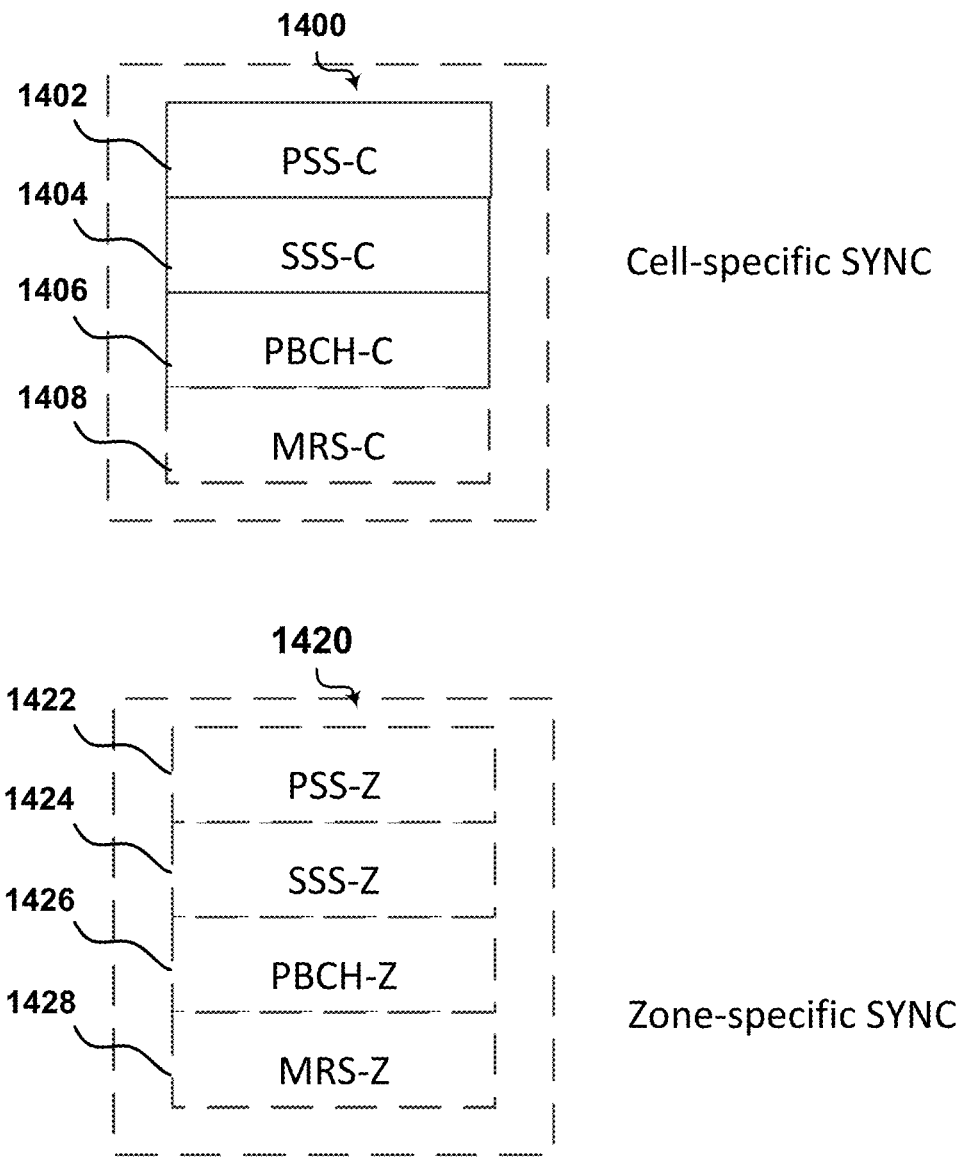
FIG. 14 is a block diagram illustrating an example of a structure of synchronization channels for uplink based mobility, according to one or more of the presently described aspects.

FIG. 14 illustrates an example structure of synchronization (SYNC) channels. In some examples, a cell may transmit two separate SYNC signals to the UE: a cell-specific SYNC signal and/or a zone-specific SYNC signal. In an aspect, a cell-specific SYNC channel/signal 1400 may include a PSS-C 1402, a SSS-C 1404, a PBCH-C 1406, and/or an MRS-C 1408. As noted, the cell may also provide a zone-specific SYNC channel/signal 1420 to the UE 115 that may include a PSS-Z 1422, a SSS-Z 1424, a PBCH-Z 1426, and/or an MRS-Z 1428 associated with the target zone. In some examples, the cell-specific SYNC signal 1400 and zone-specific SYNC signal 1420 may be decoupled such that flexible SYNC switching may be achieved for supporting different mobility modes.

In an aspect, the UE 115 may use the zone-specific information to decode the zone-specific MRS (e.g., MRS-Z 1428). In some examples, the UE 115 may perform zone monitoring based on the zone-specific MRS (e.g., MRS-Z 1428). Further, the MRS may be used to determine an initial outer loop power control (OLPC) setting for UMICH transmission. In an example, the UE 115 may periodically send an uplink measurement indication signal on the uplink UMICH, and the network may change the serving cell based on reception of the UMICH. If the zone-specific MRS signal strength becomes less than a threshold, the UE 115 may perform inter-zone mobility (e.g., based on a neighbor zone identified by the network) or perform an emergency cell search according to a downlink mobility procedure.

In some examples, the zone-specific information may be self-discoverable by the UE 115. For example, the cell may transmit a cell-specific SYNC signal (e.g., the cell-specific SYNC signal 1400) including the PSS-C 1402, the SSS-C 1404, and the PBCH-C 1406 as well as a zone-specific SYNC signal (e.g., the zone-specific SYNC signal 1420) including the PSS-Z 1422, the SSS-Z 1424 and the PBCH-Z 1426. In this example, the UE 115 may perform a zone search by detecting the zone-specific SYNC signal (e.g., the zone-specific SYNC signal 1420). For example, a zone search procedure may be similar to a cell search procedure, except using the PS S-Z 1422 and the SSS-Z 1424 to detect the zone ID and timing and/or frequency. In an aspect, the UE 115 may then decode the PBCH-Z 1426, which may provide information for transmitting the UL UMICH. After acquiring the zone, the UE 115 may monitor the MRS-Z 1428. If the signal strength of the MRS-Z 1428 is less than a threshold, the UE 115 may perform inter-zone mobility (e.g., by acquiring a new zone) or performing an emergency cell search according to a downlink mobility procedure. If the signal strength of the MRS-Z 1428 is greater than or equal to the threshold, the UE 115 may send or transmit the UL UMICH. In some aspects, the zone-specific SYNC channel/signal may be turned ON when supporting or performing UL-based mobility.

In some aspects, the cell-specific SYNC signal 1400 and zone-specific SYNC signal 1420 may each be sent in the same subframe or in different subframes (e.g., same or different downlink centric subframes). In the case that the cell-specific SYNC signal 1400 and the zone-specific SYNC signal 1420 are transmitted on the same subframe, the cell-specific SYNC signal 1400 and the zone-specific SYNC signal 1420 may be processed using FDM or TDM. Additionally or alternatively, the cell-specific SYNC signal 1400 and the zone-specific SYNC signal 1420 may each have same or different periodicity.

In some aspects, a relative offset between the cell-specific SYNC signal 1400 and the zone-specific SYNC signal 1420 may be signed in system information. For example, after the UE 115 detects one SYNC signal type (e.g., cell-specific SYNC signal or zone-specific SYNC signal), the UE can obtain the locations of the other SYNC signal type based on the relative offset that is signaled by the cell in the system information. In some examples, the cell ID and zone ID associated with the cell-specific SYNC signal 1400 and the zone-specific SYNC signal 1420, respectively, may be subdivided in a transmission bit stream. For example, the first portion may be allocated to the zone ID and the second portion allocated to the cell ID.

Figure 15:
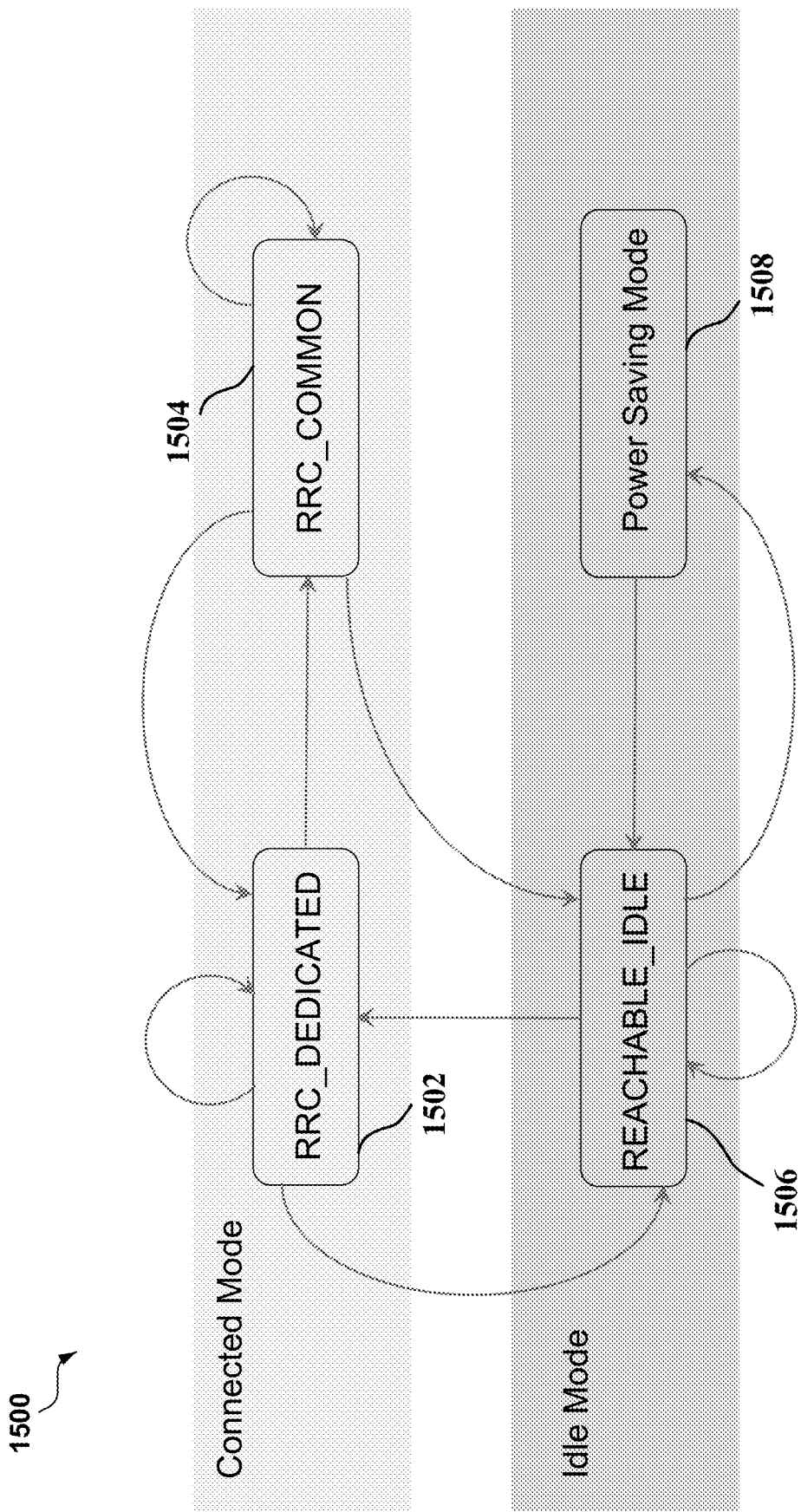
FIG. 15 is a block diagram of an example of radio resource control (RRC) states and RRC state transitions of a UE, according to one or more of the presently described aspects.

Referring to FIG. 15, an example radio resource control (RRC) states diagram 1500 is used for identifying a current RRC state, and/or an RRC state transition of a UE (e.g., the UE 115 in FIG. 1). In some aspects, the UE may operate in an RRC state, or may transition from one RRC state to another RRC state. These RRC states may be included in two modes, a Connected Mode and an Idle Mode. In FIG. 15, a Connected Mode may include, but not limited to, an RRC-DEDICATED state 1502 and/or an RRC-COMMON state 1504. In an aspect, when the UE is in the RRC-DEDICATED state 1502, UE context may be included in a radio access network (RAN), and the UE may have available air interface resources assigned, and may transmit and receive any data. In another aspect, when the UE is in the RRC-COMMON state 1504, similarly, there may be UE context in the RAN, but no assigned air interface resources for the UE, and the UE may only transmit and receive small data.

Still in FIG. 15, an Idle Mode may include, but not limited to, a REACHABLE-IDLE state 1506 (or an RRC-IDLE state) and/or a power saving mode 1508. In an aspect, when the UE is in the REACHABLE-IDLE state 1506 (or the RRC-IDLE state), there may be no UE context in the RAN, no assigned air interface resources for the UE, and the UE may only transmit and receive small data. In another aspect, when the UE is in the power saving mode 1508, there may be no UE context in the RAN, no assigned air interface resources for the UE, and the UE has no data transmissions or receptions.

Figure 16A:
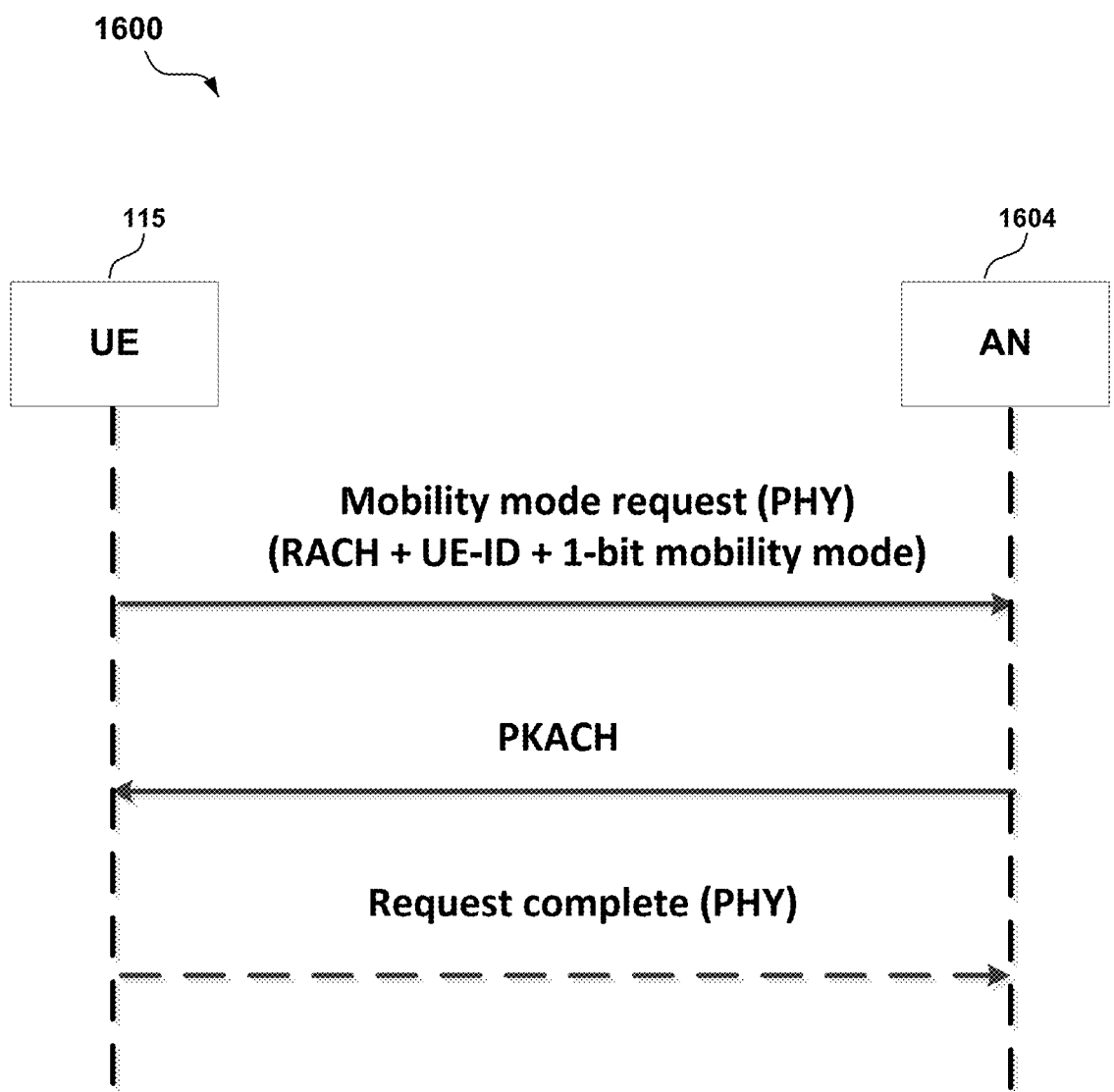
FIG. 16A is a first example of signal exchanges between a UE and an Access Node (AN) for mobility mode selection and management, according to one or more of the presently described aspects.

Referring to FIG. 16A, an example call flow 1600 shows signal exchanges between a UE (e.g., the UE 115 in FIG. 1) and an access node (AN) 1604 for mobility mode selection and management when the UE 115 is in an RRC state (e.g., the RRC-COMMON state 1504 in FIG. 15). In an aspect, the call flow 1600 may be related to a UE-driven mobility mode switching, which may include switching from a UL mobility mode to a DL mobility mode, and/or switching from a DL mobility mode to a UL mobility mode. In particular, the UE 115 sends a mobility mode request signal or message (e.g., via a physical layer procedure). In some examples, the mobility mode request signal or message may include random access channel (RACH) information, UE identification (e.g., UE-ID), and/or mobility mode information in one bit or multiple bits (e.g., mobility mode switching indication, a target or preferred mobility mode, or both). In an implementation, the one-bit mobility mode information may include a bit "0" for DL mobility mode or a bit "1" for UL mobility mode. In another implementation, the one-bit mobility mode information may include a bit "1" for DL mobility mode or a bit "0" for UL mobility mode. In an example, the one-bit mobility mode information (e.g., for mobility mode switching request) may include one bit for switching from a DL mobility mode to a UL mobility mode, or one bit for switching from a UL mobility mode to an DL mobility mode.

In an aspect, the AN 1604 may then send a PKACH to acknowledge receiving the request signal/message. The AN 1604 may also send a mobility mode indicator (with or without the PKACH) in response to the request signal/message. In an example, the mobility mode indicator may comprise one-bit information (e.g., "0" or "1") indicating whether the network accepts (e.g., YES or NO) the mobility mode switching request sent from UE 115 (e.g., in response to the one-bit mobility mode information sent from UE 115). In some examples, there is no paging indicator embedded in the PKACH. In some examples, the UE 115 may optionally send a signal to the network or AN 1604 (e.g., via a physical layer procedure) to inform the request completion.

Figure 16B:
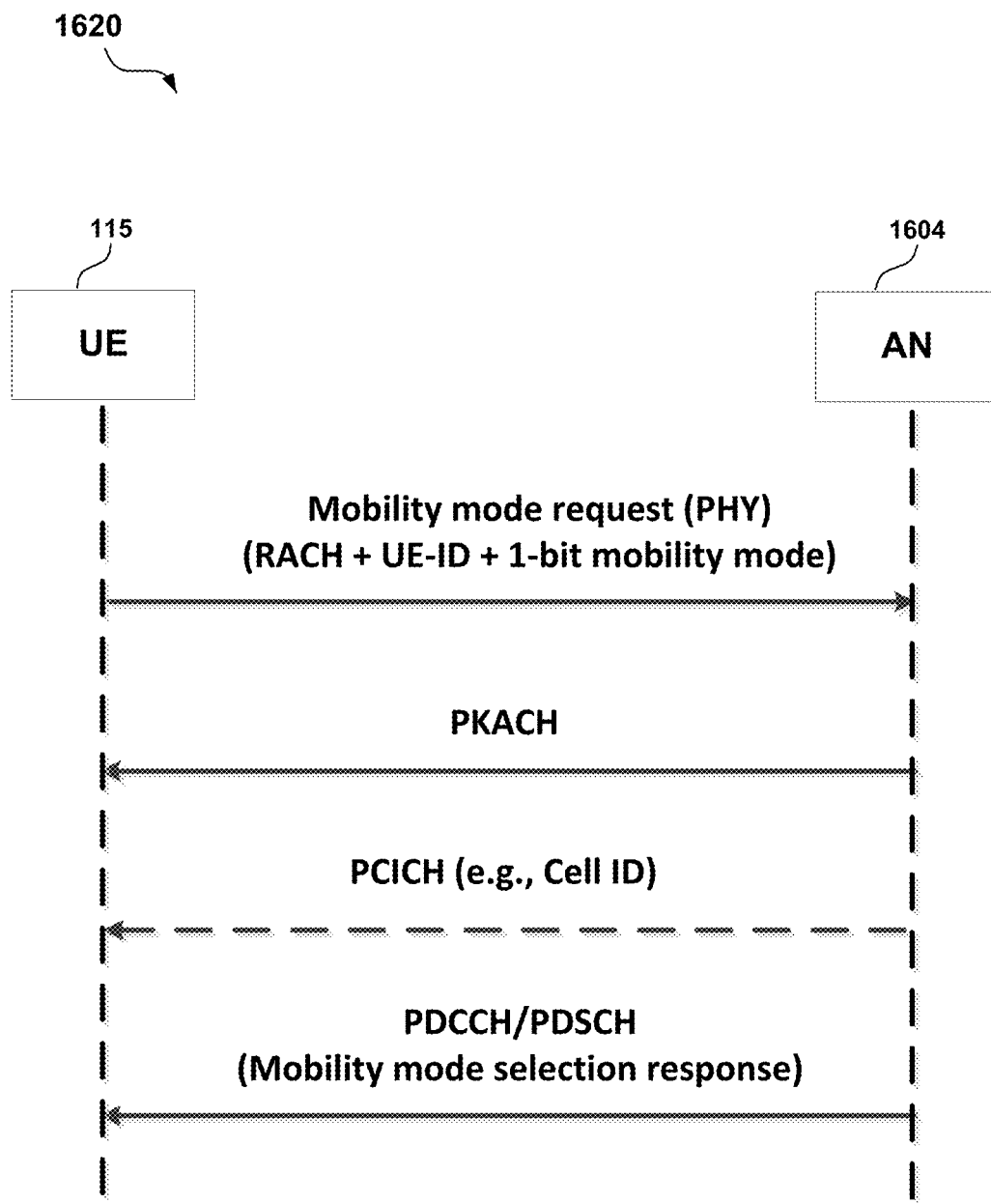
FIG. 16B is a second example of signal exchanges between a UE and an Access Node (AN) for mobility mode selection and management, according to one or more of the presently described aspects.

Referring to FIG. 16B, another example call flow 1620 shows signal exchanges between the UE 115 and the AN 1604 for mobility mode selection and management when the UE 115 is in an RRC state (e.g., the RRC-COMMON state 1504 in FIG. 15). In an aspect, the call flow 1620 may be related to a UE-driven mobility mode switching, which may include switching from a UL mobility mode to a DL mobility mode. In particular, the UE 115 sends a mobility mode request signal or message (e.g., via a physical layer procedure). In some examples, the mobility mode request signal or message may include RACH information, UE identification (e.g., UE-ID), and/or mobility mode information in one bit or multiple bits (e.g., mobility mode switching indication, a target or preferred mobility mode, or both). In an example, the one-bit mobility mode information may include a bit "0" for DL mobility mode or a bit "1" for UL mobility mode. In another example, the one-bit mobility mode information may include a bit "1" for DL mobility mode or a bit "0" for UL mobility mode. In an example, the one-bit mobility mode information (e.g., for mobility mode switching request) may include one bit for switching from a DL mobility mode to a UL mobility mode, or one bit for switching from a UL mobility mode to an DL mobility mode.

In an aspect, the network or the AN 1604 may send a PKACH to acknowledge receiving the request signal/message. The network or the AN 1604 may also send a mobility mode indicator in response to the request signal/message. In an example, the mobility mode indicator may comprise one-bit information (e.g., "0" or "1") indicating whether the network accepts (e.g., YES or NO) the mobility mode switching request sent from the UE 115 (e.g., in response to the one-bit mobility mode information sent from the UE 115). In some examples, the UE 115 may be aware of one or more zones (with a plurality of cells) in the network, but not be aware of a certain cell or cells for communications. In this case, the network or the AN 1604 may optionally send a Physical Cell ID Channel (PCICH) to the UE 115 to inform or indicate one or more cell identifications (e.g., Cell ID(s)), and the UE 115 may use the informed or indicated one or more cell identifications for mobility mode switching, for example, from a UL mobility mode to a DL mobility mode.

In some examples, the network or the AN 1604 may send a mobility mode configuration response via a Physical Downlink Control Channel (PDCCH) or a Physical Downlink Shared Channel (PDSCH). UE 115 may then decode the PDCCH/PDSCH using, for example, a Mobility Indication-Radio Network Temporary Identifier (MI-RNTI), and therefore, the UE 115 may not be necessary to go into or switch to an RRC-DEDICATED state (e.g., in FIG. 15) to decode the received PDCCH/PDSCH.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 17:
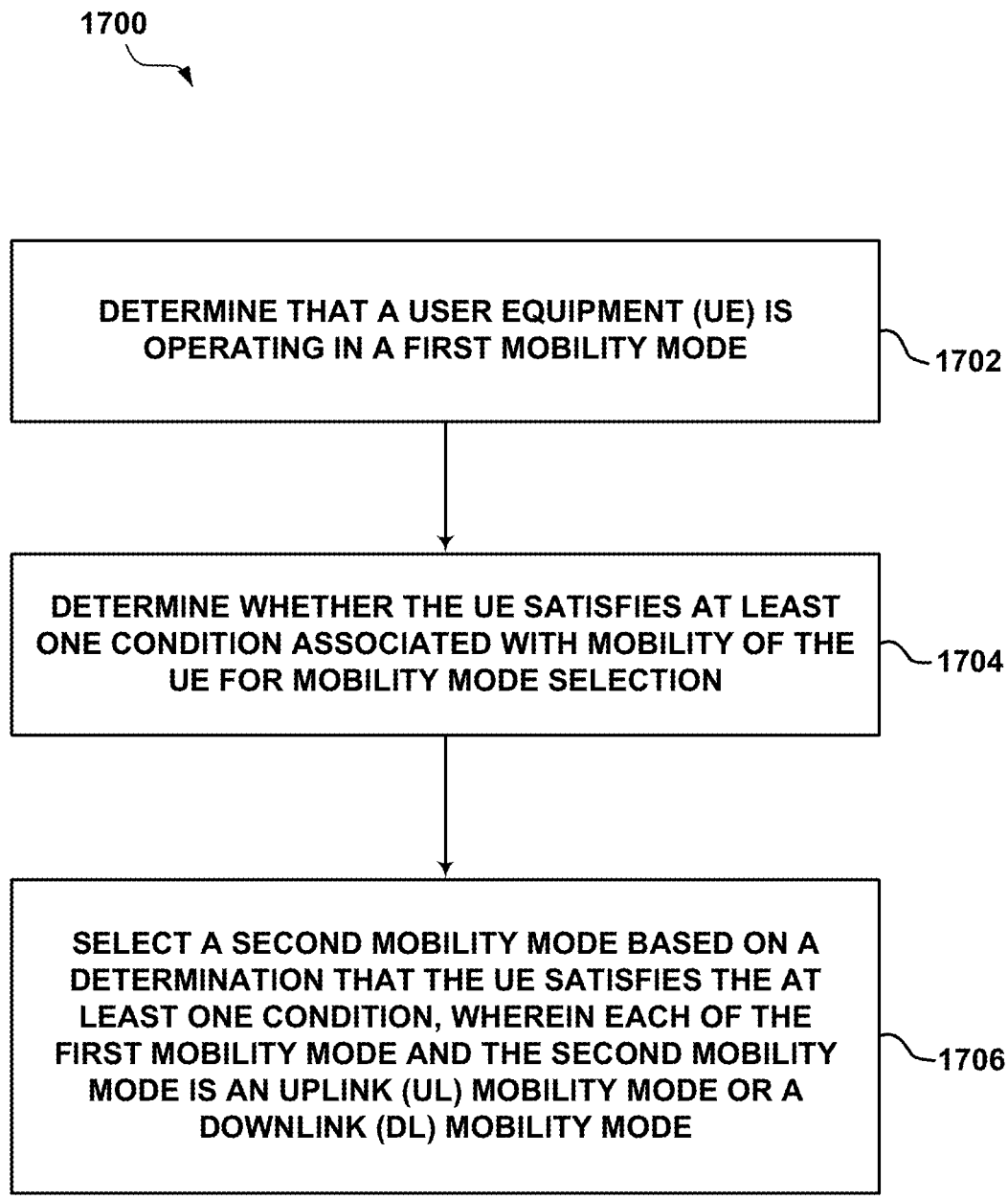
FIG. 17 is a flowchart of an example method of mobility mode selection and management, according to one or more of the presently described aspects.

FIG. 17 is a flowchart of an example method 1700 of mobility mode selection and management for wireless communications, in accordance with one or more aspects of the present disclosure. In an operational aspect, a UE such as UE 115 (FIG. 1), and/or a network entity such as base station 105 (FIG. 1) may perform one or more aspects of the method 1700 for mobility mode selection and management. For example, for base station 105, one or more of the processors 305, the memory 302, the modem 320, the communication management component 340, and/or its sub-components (e.g., the signal measuring component 346, the mobility mode component 348) may be configured to perform one or more aspects of the method 1700. In another example, for UE 115, one or more of the processors 405, the memory 402, the modem 420, the mobility management component 440, and/or its sub-components (e.g., the mobility mode component 446, the RRC state component 448) may be configured to perform one or more aspects of the method 1700.

In an aspect, at block 1702, the method 1700 may include determining that a UE is operating in a first mobility mode. In an aspect, for example, the mobility mode component 348/446 may identify or determine whether the UE (e.g., the UE 115) is operating in a UL mobility mode or a DL mobility mode, as described herein.

In an aspect, at block 1704, the method 1700 may include determining whether the UE satisfies at least one condition associated with mobility of the UE for mobility mode selection. In an aspect, for example, the communication management component 340, and/or its sub-components of the base station 105 (e.g., the signal measuring component 346, the mobility mode component 348), or the mobility management component 440, and/or its sub-components of the UE 115 (e.g., the mobility mode component 446, the RRC state component 448) may be configured to identify or determine whether the UE satisfies at least one condition associated with mobility of the UE for mobility mode selection. In some examples, the at least one condition may include the signal quality falling below a threshold based on measurements of a reference signal. In some examples, the at least one condition may be related to a speed of the UE 115, a speed threshold of the UE 115, a radio condition of the UE 115, location information of the UE 115, or signal measurements of the UE 115. In some further examples, the at least one condition may be related to a current RRC state of the UE 115, or information or condition(s) related to the UE 115 transitioning from the current RRC state to another RRC state, as described herein (see, e.g., FIG. 15).

In an aspect, at block 1706, the method 1700 may include selecting a second mobility mode based on a determination that the UE satisfies the at least one condition, wherein each of the first mobility mode and the second mobility mode is a UL mobility mode or a DL mobility mode. In an aspect, for example, the communication management component 340, and/or its sub-components of the base station 105 (e.g., the mobility mode component 348), or the mobility management component 440, and/or its sub-components of the UE 115 (e.g., the mobility mode component 446) may be configured to select or switch the mobility mode (e.g., a UL mobility mode or a DL mobility mode) based on the determination(s) at block 1702 and/or block 1704. For example, the mobility mode component 348 or the mobility mode component 446 may be configured to transition the UE 115 from the current mobility mode to the selected mobility mode, and the selected mobility mode may be the same or different from the current mobility mode.

In another aspect of the method 1700, determining whether the UE satisfies the at least one condition associated with mobility of the UE may include determining at least one parameter associated with the UE, and the at least one parameter may include one or more of a speed of the UE, a speed threshold of the UE, a radio condition of the UE, location information of the UE, or signal measurements of the UE.

In another aspect, the method 1700 may include determining that the at least one parameter associated with the UE exceeds a threshold, and transitioning the UE from the first mobility mode to the selected second mobility mode based on the determination. In an example, the first mobility mode may be a UL mobility mode and the second mobility mode may be a DL mobility mode.

In another aspect, the method 1700 may include determining that the at least one parameter associated with the UE is less than a threshold, and transitioning the UE from the first mobility mode to the selected second mobility mode based on the determination. In an example, the first mobility mode may be a DL mobility mode and the second mobility mode may be a UL mobility mode.

In another aspect, the method 1700 may include receiving the at least one parameter in Minimum System Information Blocks (MSIB), wherein the at least one parameter is related to the mobility mode selection.

In another aspect, the method 1700 may include receiving a neighbor list from a serving zone, wherein the neighbor list includes information associated with at least one of a neighbor zone, a neighbor cell, a neighbor radio access technology (RAT), or a neighbor frequency.

In another aspect, the method 1700 may include receiving, at the UE, a neighbor list from a serving zone that identifies, from a list of available zones, a subset of neighbor zones associated with the UE; receiving a synchronization (SYNC) signal from a target zone; determining whether the target zone is included in the neighbor list based on the SYNC signal; comparing a reference signal of the serving zone to a reference signal of the target zone in response to a determination that the target zone is included in the neighbor list; and determining whether to transition to the target zone based on the comparison.

In another aspect of the method 1700, the determination of whether the UE satisfies the at least one condition associated with mobility of the UE may include the following: determining a current radio resource control (RRC) state of the UE, wherein the current RRC state is one of an RRC-IDLE state, an RRC-COMMON state, or an RRC-DEDICATED state; or determining whether the UE transitions from a first RRC state to a second RRC state, wherein each of the first RRC state and the second RRC state is one of an RRC-IDLE state, an RRC-COMMON state, or an RRC-DEDICATED state.

In another aspect, the method 1700 may include determining that the UE transitions from the first RRC state to the second RRC state, and selecting the mobility mode used in the first RRC state as the second mobility mode.

In another aspect, the method 1700 may include determining that the UE transitions from the first RRC state to the second RRC state; sending a first message including a mobility mode recommendation; and receiving a second message including a mobility mode configuration in response to the first message.

In another aspect, the method 1700 may include handshaking with a network entity to select at least one of the UL mobility mode or the DL mobility mode via at least one of a physical layer procedure, a media access control (MAC) layer procedure, or dedicated RRC messages.

In another aspect, the method 1700 may include determining that the UE transitions from the first RRC state to the second RRC state; receiving an RRC reconfiguration message; and selecting the second mobility mode based on the received RRC reconfiguration message.

In another aspect, the method 1700 may include determining that the UE transitions from the first RRC state to the second RRC; and initiating a mobility mode switching by sending an RRC connection setup request message or receiving a paging message.

In another aspect, the method 1700 may include receiving, at the UE, a paging message; and selecting at least one of the UL mobility mode or the DL mobility mode based on the determination of the current RRC state and the received paging message.

In another aspect, the method 1700 may include sending, by the UE, a mobility mode request message in response to a determination that the UE satisfies at least one condition; and receiving a Physical Keep-Alive Channel (PKACH) including at least an acknowledgement or a mobility mode indicator in response to the mobility mode request message.

In another aspect, the method 1700 may include sending, by the UE, a mobility mode request message in response to a determination that the UE satisfies at least one condition; receiving a downlink signal including a mobility mode configuration response message in response to the mobility mode request message; and decoding the downlink signal using a mobility indication.

In another aspect, the method 1700 may include receiving a synchronization (SYNC) signal from a cell, wherein the SYNC signal includes a cell-specific SYNC and a zone-specific SYNC, and determining whether to decode a measurement reference signal (MRS) from the cell based on a cell identification (ID) or a zone ID associated with the SYNC signal.

In another aspect of the method 1700, the determination of whether to decode the MRS from the cell may include determining whether the cell ID or the zone ID is included in the neighbor list.

In another aspect, the method 1700 may include transmitting a physical uplink measurement indication channel (PUMICH) to a target zone, wherein the PUMICH includes UE identification (ID) as the UE-ID used in a source zone, a new UE-ID which is assigned by the target zone, or an initial access UE-ID.

In another aspect of the method 1700, comparing the reference signal of the serving zone to the reference signal of the target zone may include the following: measuring a first signal quality based on the reference signal of the serving zone; measuring a second signal quality based on the reference signal of the target zone; and determining a signal quality difference between the first signal quality and the second signal quality.

In another aspect, the method 1700 may include determining whether a mobility trigger condition is satisfied, wherein the mobility trigger condition includes a first signal quality associated with the serving zone falls below a threshold; and wherein receiving the neighbor list from the serving zone is in response to the mobility trigger condition being satisfied.

In another aspect of the method 1700, the neighbor list may include one or both of a neighboring zones or neighboring cells associated with the UE.

In another aspect, the method 1700 may include determining that the target zone is not included in the neighbor list based on the SYNC signal or that the neighbor list does not include neighboring zones; determining to transition to a suitable target cell included in the neighbor list; and transitioning the UE from the serving zone to the target cell.

In another aspect of the method 1700, the SYNC signal may include an indication of one or both of a cell ID or a zone ID.

In another aspect of the method 1700, the determination of whether the target zone is included in the neighbor list based on the SYNC signal may include determining whether the zone ID is included in the neighbor list.

In an aspect of the method 1700, a neighbor list may be received from the serving zone either periodically or based on an event trigger. In another aspect of the method 1700, the neighbor list may be received in response to a request initiated by the UE to the serving zone to transmit the neighbor list. In another aspect of the method 1700, the neighbor list may be received without the UE requesting the serving zone to transmit the neighbor list.

Figure 18:
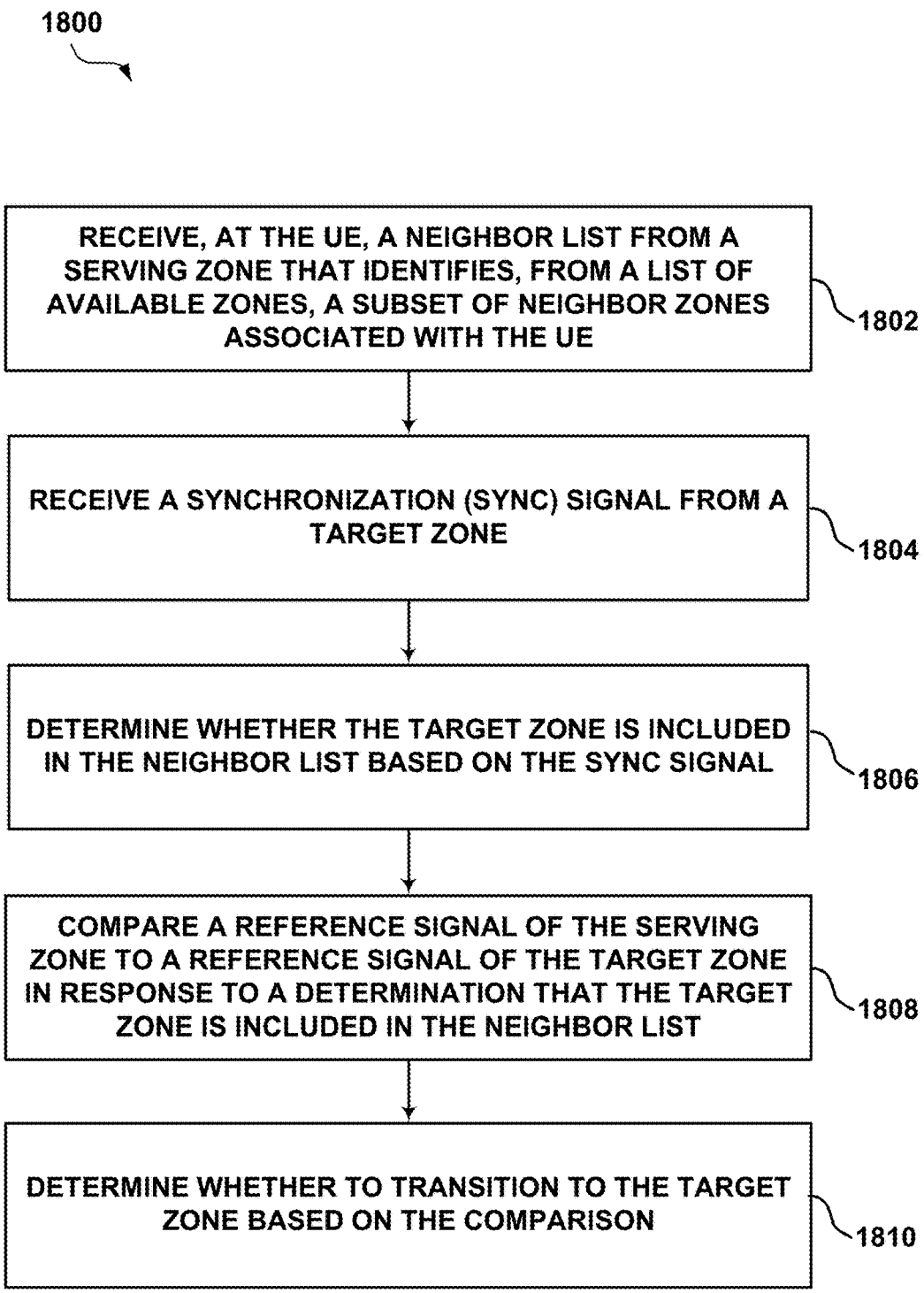
FIG. 18 is a flowchart of an example method of mobility mode management for inter-zone mobility, according to one or more of the presently described aspects.

FIG. 18 illustrates a flowchart of an example method 1800 of mobility mode management for inter-zone mobility for wireless communications, in accordance with aspects of the present disclosure. In an aspect, the method 1800 may be performed by a UE (e.g., the UE 115). Although the method 1800 is described below with respect to the elements of the UE 115, other components may be used to implement one or more of the steps described herein.

At block 1802, the method 1800 may include receiving, at the UE, a neighbor list from a serving zone that identifies, from a list of available zones, a subset of neighbor zones associated with the UE. In some aspects, the neighbor list may be received from the serving zone in response to the mobility trigger condition being satisfied. For example, the UE 115 may determine whether a mobility trigger condition is satisfied (e.g., whether a first signal quality associated with the serving zone falls below a threshold). In one or more examples, the neighbor list may include one or more of a neighboring zones, neighboring cells, neighbor RAT information, neighbor frequency information, or a combination thereof associated with the UE. In one or more examples, the neighbor list may be received from the serving zone either periodically or based on an event trigger. For example, the neighbor list may be received in response to a request initiated by the UE 115 to the serving zone to transmit the neighbor list (e.g., in an autonomous mode where the UE transitions from uplink mobility mode to downlink mobility mode based on measurements of the MRS at the UE). In other examples, the neighbor list may be received without the UE requesting the serving zone to transmit the neighbor list (e.g., network initiated uplink mobility mode to downlink mobility mode transition). In an example, aspects of block 1802 may be performed by neighbor identification component 442 as described with reference to FIG. 4.

At block 1804, the method 1800 may include receiving a SYNC signal from a target zone. In an aspect, for example, aspects of block 1804 may be performed by SYNC signal decoding component 444 as described with reference to FIG. 4.

At block 1806, the method 1800 may include determining whether the target zone is included in the neighbor list based on the SYNC signal. In some examples, the SYNC signal may include an indication of one or both of a cell ID or a zone ID. Determining whether the target zone is included in the neighbor list based on the SYNC signal may comprise determining whether the zone ID is included in the neighbor list. In an aspect, for example, aspects of block 1805 may also be performed by SYNC signal decoding component 444 in collaboration with the neighbor identification component 442 as described with reference to FIG. 4.

At block 1808, the method 1800 may include comparing a reference signal of the serving zone to a reference signal of the target zone in response to a determination that the target zone is include in the neighbor list. In some examples, comparing the reference signal of the serving zone to the reference signal of the target zone may comprise measuring a first signal quality based on the reference signal (e.g., MRS) of the serving zone, and measuring a second signal quality based on the reference signal (e.g., MRS) of the target zone. In some aspects, the method 1800 may further include determining a signal quality difference between the first signal quality and the second signal quality. In an aspect, for example, aspects of block 1808 may be performed by mobility mode component 446 as described with reference to FIG. 4.

At block 1810, the method may include determining whether to transition to the target zone based on the comparison. In some aspects, the UE 115 may determine to transition to a neighbor cell when no neighbor zone is available. For example, the UE 115 may determine that the target zone is not included in the neighbor list based on the SYNC signal or that the neighbor list does not include neighboring zone. In such situations, the UE 115 may determine to transition to a suitable target cell included in the neighbor list instead. Accordingly, based on the determination, the UE 115 may transition from the serving zone to the target cell when no target zone is available. In an aspect, for example, aspects of block 1810 may also be performed by mobility mode component 446 described with reference to FIG. 4.

Figure 19:
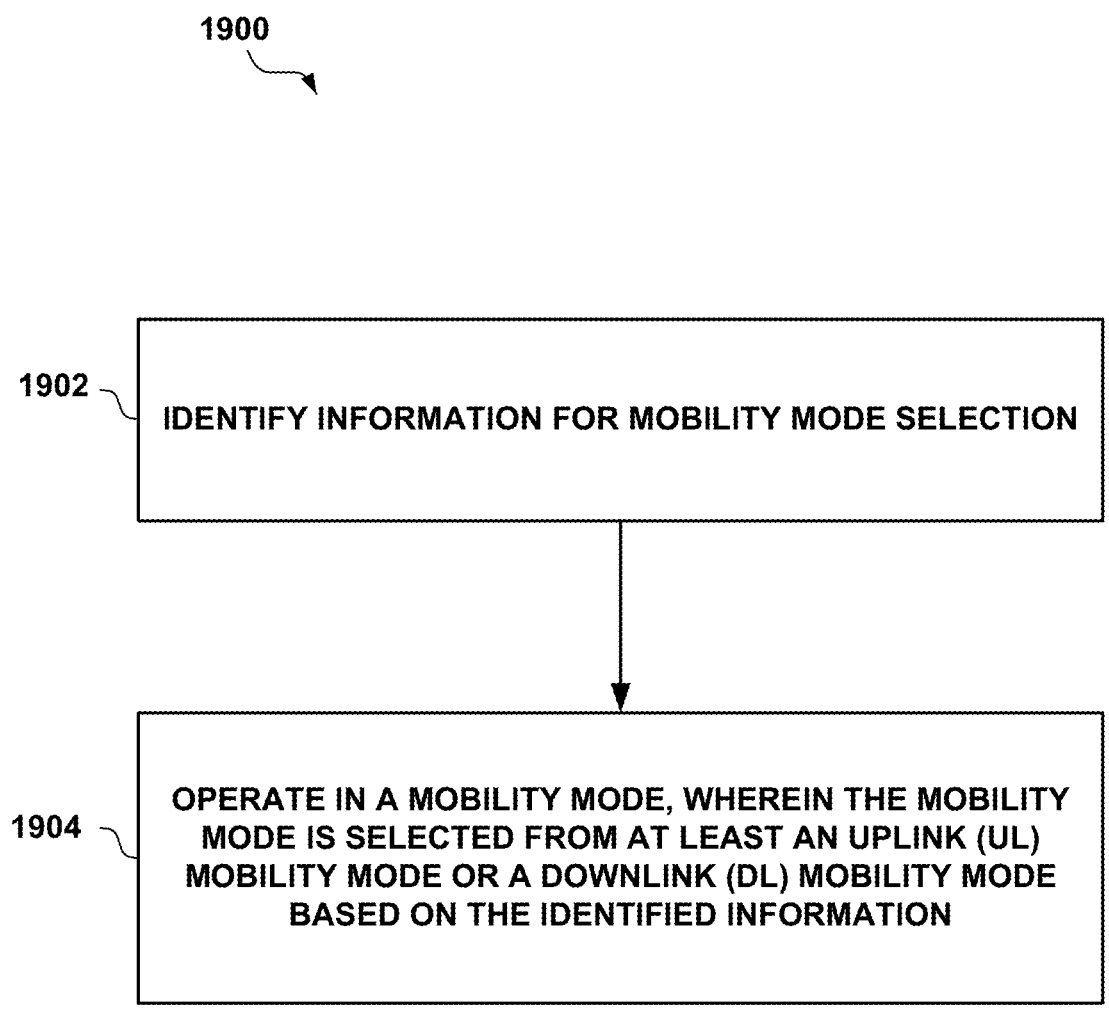
FIG. 19 is a flowchart of an example method of mobility mode selection and management for a UE, according to one or more of the presently described aspects.

Referring to FIG. 19, in an operational aspect, a UE such as UE 115 (FIG. 1), and/or a network entity such as base station 105 (FIG. 1) may perform one or more aspects of the method 1900 for mobility mode selection and management. For example, for base station 105, one or more of the processors 305, the memory 302, the modem 320, the communication management component 340, and/or its sub-components (e.g., the signal measuring component 346, the mobility mode component 348) may be configured to perform one or more aspects of the method 1900. In another example, for UE 115, one or more of the processors 405, the memory 402, the modem 420, the mobility management component 440, and/or its sub-components (e.g., the mobility mode component 446, the RRC state component 448)

may be configured to perform one or more aspects of the method 1900. Although the method 1900 is described below with respect to the elements of the UE 115, other components may be used to implement one or more of the steps described herein.

In an aspect, at block 1902, the method 1900 may include identifying information for mobility mode selection. In an aspect, for example, the mobility management component 440, and/or its sub-components (e.g., the mobility mode component 446, the RRC state component 448) may identify information, for example, a speed of UE 115, signal measurements, locations, a current RRC state of the UE 115, or information or condition related to the UE 115 transitioning from the current RRC state to another RRC state, as described herein.

In an aspect, at block 1904, the method 1900 may include operating in a mobility mode, wherein the mobility mode is selected from at least UL mobility mode or a DL mobility mode based on the identified information. In an aspect, for example, the mobility management component 440, and/or its sub-components (e.g., the mobility mode component 446) may perform the mobility mode selection and management, for example, based on the information identified at block 1902.

In another aspect, the method 1900 may include identifying a current radio resource control (RRC) state of the UE, wherein the current RRC state is one of an RRC-IDLE state, an RRC-COMMON state, or an RRC-DEDICATED state.

In another aspect, the method 1900 may include selecting the mobility mode used in the identified RRC-IDLE state when the UE transitions from the identified RRC-IDLE state to the RRC-DEDICATED state.

In another aspect, the method 1900 may include transitioning from the identified RRC-IDLE state to the RRC-DEDICATED state; sending a first message including a mobility mode recommendation; and receiving a second message including a mobility mode configuration in response to sending the first message.

In another aspect, the method 1900 may include, when the identified RRC state is the RRC-DEDICATED state, handshaking with a network entity to select at least the UL mobility mode or the DL mobility mode through dedicated RRC messages, or via a physical layer procedure, or via a media access control (MAC) layer procedure.

In another aspect, the method 1900 may include selecting the mobility mode used in the identified RRC-DEDICATED state when the UE transitions from the identified RRC-DEDICATED state to the RRC-COMMON state.

In another aspect, the method 1900 may include transitioning from the identified RRC-DEDICATED state to the RRC-COMMON state; receiving an RRC reconfiguration message; and selecting a mobility mode based on the received RRC reconfiguration message.

In another aspect, the method 1900 may include selecting the mobility mode used in the RRC-COMMON state when the UE transitions from the identified RRC-COMMON state to the RRC-DEDICATED state.

In another aspect, the method 1900 may include transitioning from the identified RRC-COMMON state to the RRC-DEDICATED state; and initiating a mobility mode switching by sending an RRC connection setup request message or receiving a paging message.

In another aspect, the method 1900 may include, when the identified RRC state is the RRC-COMMON state and in response to receiving a paging message, selecting at least one of the UL mobility mode or the DL mobility mode based on the received paging message.

In another aspect, the method 1900 may include, when the identified RRC state is the RRC-COMMON state, sending a mobility mode request message in response to the identified information; and receiving a Physical Keep-Alive Channel (PKACH) including at least an acknowledgement or a mobility mode indicator in response to the mobility mode request message.

In another aspect, the method 1900 may include, when the identified RRC state is the RRC-COMMON state, sending a mobility mode request message in response to the identified information; receiving a downlink signal including a mobility mode configuration response message in response to the mobility mode request message; and decoding the downlink signal using a mobility indication.

In another aspect of the method 1900, the information may include at least one of a UE speed, a UE speed threshold, signal measurements, location information, or channel conditions.

In another aspect, the method 1900 may include receiving one or more parameters related to mobility mode selection in a Minimum System Information Blocks (MSIB) for comparing the identified information.

Figure 20:
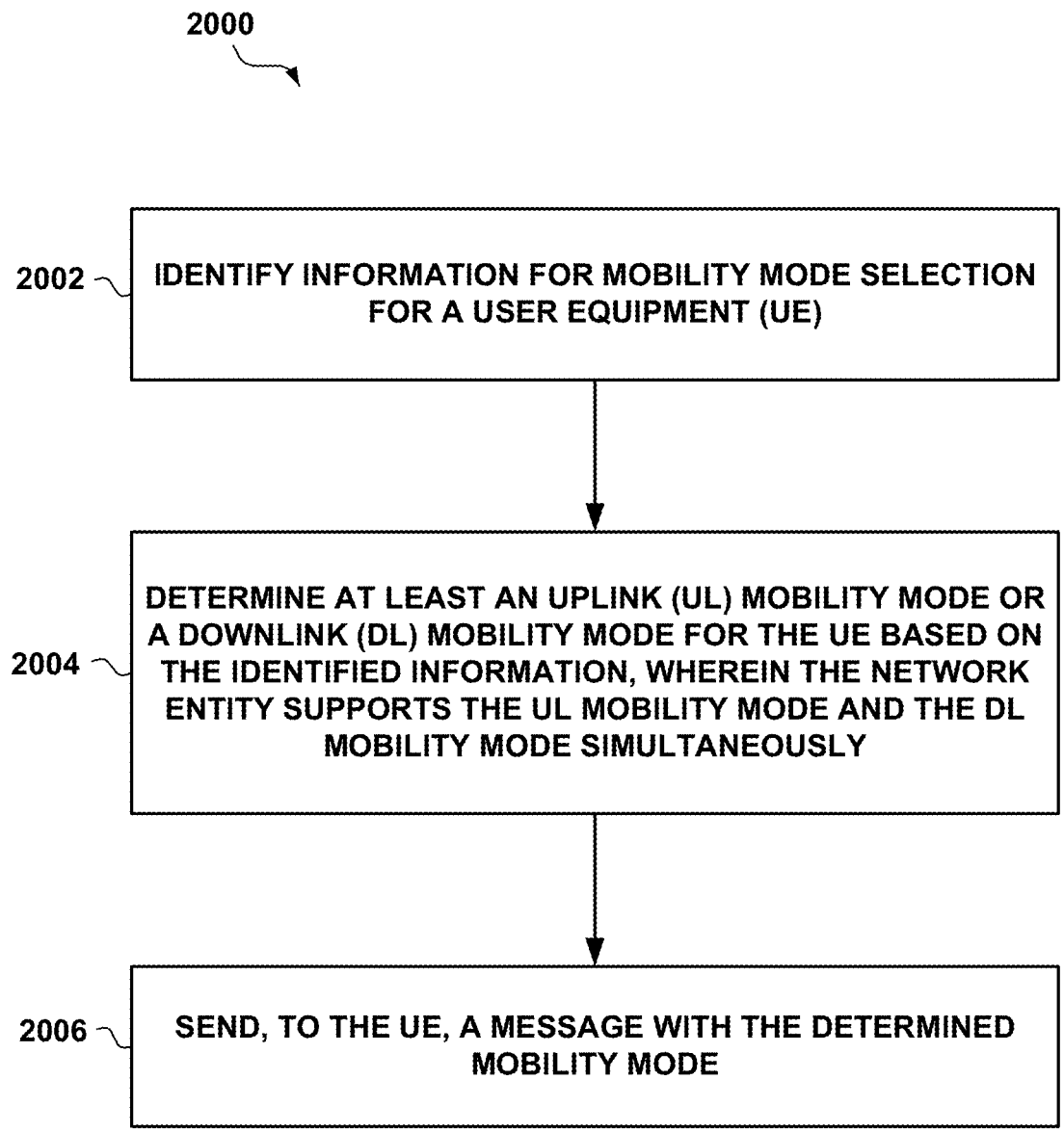
FIG. 20 is a flowchart of an example method of mobility mode selection and management for a network entity (e.g., a base station), according to one or more of the presently described aspects.

Referring to FIG. 20, in an operational aspect, a network entity such as the base station 105 (FIG. 1) may perform one or more aspects of a method 2000 for mobility mode selection and management for a UE such as UE 115 (FIG. 1). For example, one or more of the processors 305, the memory 302, the modem 320, the communication management component 340, and/or its sub-components (e.g., the signal measuring component 346, the mobility mode component 348) may be configured to perform one or more aspects of the method 2000. Although the method 2000 is described below with respect to the elements of the base station 105, other components may be used to implement one or more of the steps described herein.

In an aspect, at block 2002, the method 2000 may include identifying information for mobility mode selection for a UE (e.g., the UE 115). In an aspect, for example, the communication management component 340, and/or its sub-components (e.g., the signal measuring component 346, the mobility mode component 348) may identify, determine, or receive information, for example, a speed of UE 115, signal measurements, locations, a current RRC state of UE 115, or information or condition(s) related to UE 115 transitioning from the current RRC state to another RRC state, as described herein.

In an aspect, at block 2004, the method 2000 may include determining at least a UL mobility mode or a DL mobility mode for the UE 115 based on the identified information, wherein the network entity (e.g., the base station 105) supports the UL mobility mode and the DL mobility mode simultaneously. In an aspect, for example, the communication management component 340, and/or its sub-components (e.g., the mobility mode component 348) may perform the mobility mode selection and management, for example, based on the information identified at block 2002.

In an aspect, at block 2006, the method 2000 may include sending a message with the determined mobility mode to the UE (e.g., the UE 115). In an aspect, for example, one or more of the processors 305, the memory 302, the modem 320, the communication management component 340, and/or its sub-components (e.g., the mobility mode component 348) may send or transmit a message with the determined mobility mode (e.g., a UL mobility mode or a DL mobility mode), as described herein.

In another aspect, the method 2000 may include receiving, from the UE, a first message including a mobility mode recommendation when the UE is transitioning from a radio resource control (RRC)-IDLE state to an RRC-DEDICATED state; and sending, to the UE, a second message including a mobility mode configuration in response to the received first message.

In another aspect, the method 2000 may include handshaking with the UE to select at least the UL mobility mode or the DL mobility mode through dedicated radio resource control (RRC) messages, or via a physical layer procedure, or via a media access control (MAC) layer procedure when the UE is in an RRC-DEDICATED state.

In another aspect, the method 2000 may include sending an RRC reconfiguration message for mobility mode selection, in response to the identified information, when the UE is transitioning from an RRC-DEDICATED state to an RRC-COMMON state.

In another aspect, the method 2000 may include initiating a mobility mode switching, in response to the identified information, by receiving an RRC connection setup request message or sending a paging message when the UE is transitioning from an RRC-COMMON state to an RRC-DEDICATED state.

In another aspect, the method 2000 may include sending a paging message to the UE for mobility mode selection in response to the identified information when the UE is in an RRC-COMMON state.

In another aspect, the method 2000 may include receiving a mobility mode request message when the UE is in an RRC-COMMON state, and sending at least an acknowledgement or a mobility mode indicator over a Physical Keep-Alive Channel (PKACH).

In another aspect, the method 2000 may include receiving a mobility mode request message when UE is in an RRC-COMMON state, and sending a downlink signal including a mobility mode configuration response message in response to the received mobility mode request message.

In another aspect of the method 2000, the information may include at least one of a UE speed, a UE speed threshold, signal measurements, location information, or channel conditions.

Several aspects of a telecommunications system have been presented with reference to an LTE/LTE-A or a 5G communications system. As those skilled in the art will readily appreciate, various aspects described throughout this disclosure may be extended to other telecommunications systems, network architectures and communication standards.

By way of example, various aspects may be extended to other communications systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications, comprising:
    determining that a user equipment (UE) is operating in a first mobility mode relative to a network;
    determining whether the UE satisfies at least one condition associated with mobility of the UE for mobility mode selection, the at least one condition comprising a first condition wherein a current radio resource control (RRC) state of the UE comprises an RRC-IDLE state, an RRC-COMMON state, or an RRC-DEDICATED state, a second condition wherein the UE transitions from the current RRC state to a second RRC state, or a third condition comprising both the first condition and the second condition;
    selecting a second mobility mode based on a determination that the UE satisfies the at least one condition, wherein each of the first mobility mode and the second mobility mode is an uplink (UL) mobility mode or a downlink (DL) mobility mode; and
    transitioning the UE from the first mobility mode to the second mobility mode.

2. The method of claim 1, further comprising:
    wherein the second mobility mode is different from the first mobility mode.

3. The method of claim 1, wherein determining whether the UE satisfies the at least one condition associated with mobility of the UE comprises:
    determining at least one parameter associated with the UE, wherein the at least one parameter includes one or more of a speed of the UE, a speed threshold of the UE, a radio condition of the UE, location information of the UE, or signal measurements of the UE.

4. The method of claim 3, further comprises:
    determining that the at least one parameter associated with the UE exceeds a threshold; and
    wherein transitioning the UE from the first mobility mode to the second mobility mode comprises transitioning based on the determination, wherein the first mobility mode is the UL mobility mode and the second mobility mode is the DL mobility mode.

5. The method of claim 3, further comprising:
determining that the at least one parameter associated with the UE is less than a threshold; and
wherein transitioning the UE from the first mobility mode to the second mobility mode comprises transitioning based on the determination, wherein the first mobility mode is the DL mobility mode and the second mobility mode is the UL mobility mode.

6. The method of claim 3, further comprising:
receiving the at least one parameter in Minimum System Information Blocks (MSIB), wherein the at least one parameter is related to the mobility mode selection.

7. The method of claim 1, further comprising:
receiving a neighbor list from a serving zone, wherein the neighbor list includes information associated with at least one of a neighbor zone, a neighbor cell, a neighbor radio access technology (RAT), or a neighbor frequency.

8. The method of claim 1, further comprising:
receiving, at the UE, a neighbor list from a serving zone that identifies, from a list of available zones, a subset of neighbor zones associated with the UE;
receiving a synchronization (SYNC) signal from a target zone;
determining whether the target zone is included in the neighbor list based on the SYNC signal;
comparing a reference signal of the serving zone to a reference signal of the target zone in response to a determination that the target zone is included in the neighbor list; and
determining whether to transition to the target zone based on the comparison.

9. The method of claim 1, wherein
the second RRC state is one of the RRC-IDLE state, the RRC-COMMON state, or the RRC-DEDICATED state.

10. The method of claim 1, further comprising:
selecting a mobility mode used in the current RRC state as the second mobility mode.

11. The method of claim 1, further comprising:
sending a first message including a mobility mode recommendation; and
receiving a second message including a mobility mode configuration in response to the first message.

12. The method of claim 1, further comprising:
handshaking with a network entity to select at least one of the UL mobility mode or the DL mobility mode via at least one of a physical layer procedure, a media access control (MAC) layer procedure, or dedicated RRC messages.

13. The method of claim 1, further comprising:
receiving an RRC reconfiguration message; and
selecting the second mobility mode based, at least in part, on the received RRC reconfiguration message.

14. The method of claim 1, further comprising:
initiating a mobility mode switching by sending an RRC connection setup request message or receiving a paging message or both.

15. The method of claim 1, further comprising:
receiving, at the UE, a paging message; and
selecting at least one of the UL mobility mode or the DL mobility mode based on the determination of the current RRC state and the received paging message.

16. The method of claim 1, further comprising:
sending, by the UE, a mobility mode request message in response to a determination that the UE satisfies at least one condition; and
receiving a Physical Keep-Alive Channel (PKACH) including at least an acknowledgement or a mobility mode indicator in response to the mobility mode request message or both.

17. The method of claim 1, further comprising:
sending, by the UE, a mobility mode request message in response to a determination that the UE satisfies at least one condition;
receiving a downlink signal including a mobility mode configuration response message in response to the mobility mode request message; and
decoding the downlink signal using a mobility indication.

18. An apparatus for wireless communications, comprising:
a memory configured to store instructions; and
at least one processor coupled with the memory, wherein the at least one processor is configured to execute the instructions to:
determine that the apparatus is operating in a first mobility mode relative to a network;
determine whether the apparatus satisfies at least one condition associated with mobility of the apparatus for mobility mode selection, the at least one condition comprising a first condition wherein a current radio resource control (RRC) state of the apparatus comprises an RRC-IDLE state, an RRC-COMMON state, or an RRC-DEDICATED state, a second condition wherein the apparatus transitions from the current RRC state to a second RRC state, or a third condition comprising both the first condition and the second condition;
select a second mobility mode based on a determination that the apparatus satisfies the at least one condition, wherein each of the first mobility mode and the second mobility mode is an uplink (UL) mobility mode or a downlink (DL) mobility mode; and
initiate transition of the apparatus from the first mobility mode to the second mobility mode.

19. The apparatus of claim 18, wherein the second mobility mode is different from the first mobility mode.

20. The apparatus of claim 18, wherein the at least one processor is configured to execute further instructions to determine at least one parameter associated with the apparatus, wherein the at least one parameter includes one or more of a speed of the apparatus, a speed threshold of the apparatus, a radio condition of the apparatus, location information of the apparatus, or signal measurements of the apparatus.

21. The apparatus of claim 18, wherein the at least one processor is configured to execute further instructions to:
determine that the at least one parameter associated with the apparatus exceeds a threshold; and
wherein the instructions to transition the apparatus from the first mobility mode to the second mobility mode are based on the determination, wherein the first mobility mode is the UL mobility mode and the second mobility mode is the DL mobility mode.

22. The apparatus of claim 18, wherein the at least one processor is configured to execute further instructions to:
determine that the at least one parameter associated with the apparatus is less than a threshold; and
wherein the instructions to transition the apparatus from the first mobility mode to the second mobility mode are based on the determination, wherein the first mobility mode is the DL mobility mode and the second mobility mode is the UL mobility mode.

23. The apparatus of claim 18, further comprising:
a receiver coupled with the at least one processor, wherein the at least one processor is configured to execute the instructions to:
receive, via the receiver, a neighbor list from a serving zone, wherein the neighbor list includes information associated with at least one of a neighbor zone, a neighbor cell, a neighbor radio access technology (RAT), or a neighbor frequency.

24. The apparatus of claim 18, further comprising:
a receiver coupled with the at least one processor, wherein the at least one processor is configured to execute the instructions to:
receive, via the receiver, a neighbor list from a serving zone that identifies, from a list of available zones, a subset of neighbor zones associated with the apparatus;
receive, via the receiver, a synchronization (SYNC) signal from a target zone;
determine whether the target zone is included in the neighbor list based on the SYNC signal;
compare a reference signal of the serving zone to a reference signal of the target zone in response to a determination that the target zone is included in the neighbor list; and
determine whether to transition to the target zone based on the comparison.

25. The apparatus of claim 18, wherein
the second RRC state is one of the RRC-IDLE state, the RRC-COMMON state, or the RRC-DEDICATED state.

26. The apparatus of claim 18, wherein the at least one processor is configured to execute further instructions to:
select a mobility mode used in the current RRC state as the second mobility mode.

27. The apparatus of claim 18, further comprising:
a transmitter; and
a receiver, wherein the transmitter and the receiver are coupled with the at least one processor, wherein the at least one processor is configured to execute the instructions to:
send, via the transmitter, a first message including a mobility mode recommendation; and
receive, via the receiver, a second message including a mobility mode configuration in response to sending the first message.

28. The apparatus of claim 18, further comprising:
a transmitter; and
a receiver, wherein the transmitter and the receiver are coupled with the at least one processor, wherein the at least one processor is configured to execute further instructions to:
initiate a mobility mode switching by sending an RRC connection setup request message via the transmitter, or receiving a paging message via the receiver, or both.

29. An apparatus for wireless communications, comprising:
means for determining that the apparatus is operating in a first mobility mode;
means for determining whether the apparatus satisfies at least one condition associated with mobility of the apparatus for mobility mode selection, the at least one condition comprising a first condition wherein a current radio resource control (RRC) state of the apparatus comprises an RRC-IDLE state, an RRC-COMMON state, or an RRC-DEDICATED state, a second condition wherein the apparatus transitions from the current RRC state to a second RRC state, or a third condition comprising both the first condition and the second condition;
means for selecting a second mobility mode based on a determination that the apparatus satisfies the at least one condition, wherein each of the first mobility mode and the second mobility mode is an uplink (UL) mobility mode or a downlink (DL) mobility mode; and
means for initiating transition of the apparatus from the first mobility mode to the second mobility mode.

30. A non-transitory computer-readable medium, comprising code executable by at least one processor of a user equipment (UE) to:
determine that the UE is operating in a first mobility mode;
determine whether the UE satisfies at least one condition associated with mobility of the UE for mobility mode selection, the at least one condition comprising a first condition wherein a current radio resource control (RRC) state of the UE comprises an RRC-IDLE state, an RRC-COMMON state, or an RRC-DEDICATED state, a second condition wherein the UE transitions from the current RRC state to a second RRC state, or a third condition comprising both the first condition and the second condition;
select a second mobility mode based on a determination that the UE satisfies the at least one condition, wherein each of the first mobility mode and the second mobility mode is an uplink (UL) mobility mode or a downlink (DL) mobility mode; and
initiate transition of the UE from the first mobility mode to the second mobility mode.

* * * * *